US009818133B1

(12) United States Patent
Bell et al.

(10) Patent No.: US 9,818,133 B1
(45) Date of Patent: Nov. 14, 2017

(54) METHOD FOR CONSUMER PROFILE CONSOLIDATION USING MOBILE NETWORK IDENTIFICATION

(71) Applicant: Sprint Communications Company L.P., Overland Park, KS (US)

(72) Inventors: Timothy L. Bell, Shawnee, KS (US); Sara M. Dugan, Overland Park, KS (US); Wayne W. Schroeder, Independence, MO (US); Ashwin Shashindranath, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 433 days.

(21) Appl. No.: 14/518,504

(22) Filed: Oct. 20, 2014

(51) Int. Cl.
  *G06Q 30/00* (2012.01)
  *G06Q 30/02* (2012.01)

(52) U.S. Cl.
  CPC ..... *G06Q 30/0267* (2013.01); *G06Q 30/0269* (2013.01); *G06Q 30/0275* (2013.01)

(58) Field of Classification Search
  None
  See application file for complete search history.

(56) References Cited

U.S. PATENT DOCUMENTS

| 5,636,346 A | 6/1997 | Saxe |
| 5,761,648 A | 6/1998 | Golden et al. |
| 5,848,396 A | 12/1998 | Gerace |
| 5,848,397 A | 12/1998 | Marsh et al. |
| 5,918,014 A | 6/1999 | Robinson |
| 5,918,041 A | 6/1999 | Berstis |

(Continued)

FOREIGN PATENT DOCUMENTS

| WO | WO03044703 A1 | 5/2003 |
| WO | WO2012093396 A1 | 7/2012 |

(Continued)

OTHER PUBLICATIONS

Burcham, Robert H., et al., entitled "Categorization of Unknown Variables in a Target Information Database," filed Nov. 4, 2014, U.S. Appl. No. 14/532,969.

(Continued)

*Primary Examiner* — Meredith A Long

(57) ABSTRACT

A method of consolidating consumer profiles based on mapping an external identifier of a mobile communication device to a mobile network identification by an authentication network element computer. The method comprises receiving, by an advertisement (ad) bidder server computer, an ad bid request with an external consumer identifier and consumer profile information of a mobile communication device, and receiving, by a mobile communication network, a pixel tag request from the mobile communication device with the external consumer identifier embedded in the pixel tag request, wherein the mobile communication network is maintained by a mobile network carrier that maintains the ad bidder. The method further comprises identifying a mobile network identification of the mobile communication device by the mobile communication network, and storing a mapping between the external consumer identifier and the mobile network identification.

20 Claims, 9 Drawing Sheets

(56) References Cited

U.S. PATENT DOCUMENTS

| | | |
|---|---|---|
| 5,933,811 A | 8/1999 | Angles et al. |
| 5,937,392 A | 8/1999 | Alberts |
| 5,974,398 A | 10/1999 | Hanson et al. |
| 6,202,023 B1 | 3/2001 | Hancock et al. |
| 6,233,566 B1 | 5/2001 | Levine et al. |
| 6,266,649 B1 | 7/2001 | Linden et al. |
| 6,286,005 B1 | 9/2001 | Cannon |
| 6,317,722 B1 | 11/2001 | Jacobi et al. |
| 6,321,983 B1 | 11/2001 | Katayanagi et al. |
| 6,332,127 B1 | 12/2001 | Bandera et al. |
| 6,654,725 B1 | 11/2003 | Langheinrich et al. |
| 6,826,575 B1 | 11/2004 | Waclawski |
| 6,834,266 B2 | 12/2004 | Kumar et al. |
| 6,839,680 B1 | 1/2005 | Liu et al. |
| 6,853,982 B2 | 2/2005 | Smith et al. |
| 6,910,017 B1 | 6/2005 | Woo et al. |
| 6,963,867 B2 | 11/2005 | Ford et al. |
| 6,966,536 B2 | 11/2005 | Enomoto et al. |
| 6,990,462 B1 | 1/2006 | Wilcox et al. |
| 7,022,905 B1 | 4/2006 | Hinman et al. |
| 7,065,532 B2 | 6/2006 | Elder et al. |
| 7,096,194 B2 | 8/2006 | Johnson |
| 7,127,313 B2 | 10/2006 | Neri |
| 7,143,143 B1 | 11/2006 | Thompson |
| 7,251,615 B2 | 7/2007 | Woo |
| 7,284,033 B2 | 10/2007 | Jhanji |
| 7,353,267 B1 | 4/2008 | Cunningham et al. |
| 7,406,436 B1 | 7/2008 | Reisman |
| 7,437,308 B2 | 10/2008 | Kumar et al. |
| 7,481,367 B2 | 1/2009 | Fees et al. |
| 7,647,258 B2 | 1/2010 | William et al. |
| 7,676,394 B2 | 3/2010 | Ramer et al. |
| 7,680,899 B1 | 3/2010 | Barnes et al. |
| 7,698,335 B1 | 4/2010 | Vronay |
| 7,788,644 B2 | 8/2010 | Koduru et al. |
| 7,797,565 B2 | 9/2010 | Tran et al. |
| 7,801,518 B1 | 9/2010 | Urbanek |
| 7,840,498 B2 | 11/2010 | Frank et al. |
| 7,840,551 B2 | 11/2010 | Wong et al. |
| 7,958,005 B2 | 6/2011 | Dangaltchev |
| 7,974,616 B1 | 7/2011 | Urbanek |
| 8,214,454 B1 | 7/2012 | Barnes et al. |
| 8,326,673 B1 | 12/2012 | Biere et al. |
| 8,355,955 B1 | 1/2013 | Mirchandani et al. |
| 8,423,408 B1 | 4/2013 | Barnes et al. |
| 8,442,858 B1 | 5/2013 | Barnes et al. |
| 8,788,690 B2 | 7/2014 | Short et al. |
| 9,043,432 B2 | 5/2015 | Ahopelto |
| 9,275,390 B1 | 3/2016 | Barnes et al. |
| 9,319,379 B1 | 4/2016 | Burcham et al. |
| 9,374,335 B2 | 6/2016 | Burcham et al. |
| 2001/0014601 A1 | 8/2001 | Kuwabara |
| 2001/0039500 A1 | 11/2001 | Johnson |
| 2001/0044743 A1 | 11/2001 | McKinley et al. |
| 2001/0047294 A1 | 11/2001 | Rothschild |
| 2002/0004855 A1 | 1/2002 | Cox et al. |
| 2002/0010627 A1 | 1/2002 | Lerat |
| 2002/0013727 A1 | 1/2002 | Lee |
| 2002/0026355 A1 | 2/2002 | Mitsuoka et al. |
| 2002/0026361 A1 | 2/2002 | Blom |
| 2002/0030100 A1 | 3/2002 | Katayanagi et al. |
| 2002/0032771 A1 | 3/2002 | Gledje |
| 2002/0035474 A1 | 3/2002 | Alpdemir |
| 2002/0059387 A1 | 5/2002 | Wolfe |
| 2002/0060246 A1 | 5/2002 | Gobburu et al. |
| 2002/0065713 A1 | 5/2002 | Awada et al. |
| 2002/0091569 A1 | 7/2002 | Kitaura et al. |
| 2002/0091571 A1 | 7/2002 | Thomas et al. |
| 2002/0095333 A1 | 7/2002 | Jokinen et al. |
| 2002/0107027 A1 | 8/2002 | O'Neil |
| 2002/0128904 A1 | 9/2002 | Carruthers et al. |
| 2002/0128908 A1 | 9/2002 | Levin et al. |
| 2002/0143630 A1 | 10/2002 | Steinman et al. |
| 2002/0152133 A1 | 10/2002 | King et al. |
| 2002/0165849 A1 | 11/2002 | Singh et al. |
| 2002/0184080 A1 | 12/2002 | Murad et al. |
| 2003/0004802 A1 | 1/2003 | Callegari |
| 2003/0004808 A1 | 1/2003 | Elhaoussine et al. |
| 2003/0007643 A1 | 1/2003 | Ben-Zur et al. |
| 2003/0018516 A1 | 1/2003 | Ayala et al. |
| 2003/0018558 A1 | 1/2003 | Heffner et al. |
| 2003/0023482 A1 | 1/2003 | Messner et al. |
| 2003/0028451 A1 | 2/2003 | Ananian |
| 2003/0032409 A1 | 2/2003 | Hutcheson et al. |
| 2003/0046139 A1 | 3/2003 | Beman et al. |
| 2003/0050863 A1 | 3/2003 | Radwin |
| 2003/0074251 A1 | 4/2003 | Kumar et al. |
| 2003/0074259 A1 | 4/2003 | Slyman, Jr. et al. |
| 2003/0101024 A1 | 5/2003 | Adar et al. |
| 2003/0101449 A1 | 5/2003 | Bentolila et al. |
| 2003/0126250 A1 | 7/2003 | Jhanji |
| 2003/0171962 A1 | 9/2003 | Hirth et al. |
| 2003/0172007 A1 | 9/2003 | Helmolt et al. |
| 2003/0229502 A1 | 12/2003 | Woo |
| 2004/0019540 A1 | 1/2004 | William et al. |
| 2004/0019541 A1 | 1/2004 | William et al. |
| 2004/0111315 A1 | 6/2004 | Sharma et al. |
| 2004/0148628 A1 | 7/2004 | Mears |
| 2004/0194052 A1 | 9/2004 | Hoffschulz et al. |
| 2005/0021403 A1 | 1/2005 | Ozer et al. |
| 2005/0028188 A1 | 2/2005 | Latona et al. |
| 2005/0078660 A1 | 4/2005 | Wood |
| 2005/0101332 A1 | 5/2005 | Kotzin |
| 2005/0102272 A1 | 5/2005 | Kumar et al. |
| 2005/0114829 A1 | 5/2005 | Robin et al. |
| 2005/0177419 A1 | 8/2005 | Choi et al. |
| 2005/0193036 A1 | 9/2005 | Phillips et al. |
| 2005/0194431 A1 | 9/2005 | Fees et al. |
| 2005/0197887 A1 | 9/2005 | Zuerl et al. |
| 2005/0197918 A1 | 9/2005 | Wittmer et al. |
| 2005/0211783 A1 | 9/2005 | Chou |
| 2005/0215238 A1 | 9/2005 | Macaluso |
| 2005/0228754 A1 | 10/2005 | Pezzaniti et al. |
| 2005/0229047 A1 | 10/2005 | Hanes et al. |
| 2005/0245246 A1 | 11/2005 | Munch et al. |
| 2005/0246394 A1 | 11/2005 | Neri |
| 2005/0251856 A1 | 11/2005 | Araujo et al. |
| 2005/0256759 A1 | 11/2005 | Acharya et al. |
| 2005/0278296 A1 | 12/2005 | Bostwick |
| 2006/0074769 A1 | 4/2006 | Looney et al. |
| 2006/0080135 A1 | 4/2006 | Frank et al. |
| 2006/0080171 A1 | 4/2006 | Jardins et al. |
| 2006/0085253 A1 | 4/2006 | Mengerink et al. |
| 2006/0085517 A1 | 4/2006 | Kaurila |
| 2006/0141428 A1 | 6/2006 | Herrod et al. |
| 2006/0178932 A1 | 8/2006 | Lang |
| 2006/0209884 A1 | 9/2006 | MacMullan et al. |
| 2006/0212350 A1 | 9/2006 | Ellis et al. |
| 2006/0223495 A1 | 10/2006 | Cassett et al. |
| 2006/0224437 A1 | 10/2006 | Gupta et al. |
| 2006/0271690 A1 | 11/2006 | Banga et al. |
| 2007/0005647 A1 | 1/2007 | Cugi et al. |
| 2007/0022009 A1 | 1/2007 | Cataldi et al. |
| 2007/0026871 A1 | 2/2007 | Wager |
| 2007/0060099 A1 | 3/2007 | Ramer et al. |
| 2007/0061229 A1 | 3/2007 | Ramer et al. |
| 2007/0094042 A1 | 4/2007 | Ramer et al. |
| 2007/0100963 A1 | 5/2007 | Ban et al. |
| 2007/0106520 A1 | 5/2007 | Akkiraju et al. |
| 2007/0118425 A1 | 5/2007 | Yruski et al. |
| 2007/0127500 A1 | 6/2007 | Maeng |
| 2007/0130005 A1 | 6/2007 | Jaschke |
| 2007/0192715 A1 | 8/2007 | Kataria et al. |
| 2007/0198339 A1 | 8/2007 | Shen et al. |
| 2007/0208619 A1 | 9/2007 | Branam et al. |
| 2007/0239518 A1 | 10/2007 | Chung et al. |
| 2007/0291789 A1 | 12/2007 | Kutt et al. |
| 2008/0004884 A1 | 1/2008 | Flake et al. |
| 2008/0010137 A1 | 1/2008 | Ho et al. |
| 2008/0040175 A1 | 2/2008 | Dellovo |
| 2008/0065476 A1 | 3/2008 | Klein et al. |
| 2008/0082412 A1 | 4/2008 | Tallyn et al. |
| 2008/0097851 A1 | 4/2008 | Bemmel et al. |
| 2008/0104637 A1 | 5/2008 | Rodriguez et al. |

(56) References Cited

U.S. PATENT DOCUMENTS

| | | | |
|---|---|---|---|
| 2008/0120565 | A1 | 5/2008 | Stiso et al. |
| 2008/0126515 | A1 | 5/2008 | Chambers et al. |
| 2008/0140476 | A1 | 6/2008 | Anand et al. |
| 2008/0147478 | A1 | 6/2008 | Mall et al. |
| 2008/0228583 | A1 | 9/2008 | MacDonald et al. |
| 2009/0029721 | A1 | 1/2009 | Doraswamy |
| 2009/0048977 | A1 | 2/2009 | Aggarwal et al. |
| 2009/0070129 | A1 | 3/2009 | Inbar et al. |
| 2009/0076899 | A1 | 3/2009 | Gbodimowo |
| 2009/0099931 | A1 | 4/2009 | Aaltonen et al. |
| 2009/0150215 | A1 | 6/2009 | Kalb et al. |
| 2009/0154340 | A1 | 6/2009 | Kumaresan et al. |
| 2009/0157512 | A1 | 6/2009 | King |
| 2009/0198580 | A1 | 8/2009 | Broberg et al. |
| 2009/0217354 | A1 | 8/2009 | Blum et al. |
| 2009/0222329 | A1 | 9/2009 | Ramer et al. |
| 2009/0247193 | A1* | 10/2009 | Kalavade ............... H04L 67/18 455/456.3 |
| 2009/0256858 | A1 | 10/2009 | Ogikubo et al. |
| 2009/0265245 | A1 | 10/2009 | Wright |
| 2009/0271255 | A1 | 10/2009 | Utter et al. |
| 2009/0292608 | A1 | 11/2009 | Polachek |
| 2010/0082422 | A1 | 4/2010 | Heilig et al. |
| 2010/0082429 | A1 | 4/2010 | Samdadiya et al. |
| 2010/0119111 | A1 | 5/2010 | Helfman et al. |
| 2010/0130178 | A1 | 5/2010 | Bennett et al. |
| 2010/0222035 | A1 | 9/2010 | Robertson et al. |
| 2010/0228592 | A1 | 9/2010 | Anderson et al. |
| 2010/0274815 | A1 | 10/2010 | Vanasco |
| 2011/0082939 | A1 | 4/2011 | Montemurro et al. |
| 2011/0131109 | A1 | 6/2011 | Pappas et al. |
| 2011/0153827 | A1 | 6/2011 | Yengalasetti et al. |
| 2011/0161512 | A1 | 6/2011 | Wang et al. |
| 2011/0239288 | A1 | 9/2011 | Cross et al. |
| 2011/0246267 | A1* | 10/2011 | Williams ............... G06Q 30/02 705/14.4 |
| 2011/0246890 | A1 | 10/2011 | Mellamphy et al. |
| 2011/0258049 | A1 | 10/2011 | Ramer et al. |
| 2011/0263196 | A1 | 10/2011 | Saros et al. |
| 2011/0270687 | A1 | 11/2011 | Bazaz |
| 2011/0288913 | A1 | 11/2011 | Waylonis et al. |
| 2012/0059696 | A1 | 3/2012 | Theberge et al. |
| 2012/0072271 | A1 | 3/2012 | Dessert et al. |
| 2012/0123830 | A1 | 5/2012 | Svendsen et al. |
| 2012/0170521 | A1 | 7/2012 | Vogedes et al. |
| 2012/0179536 | A1 | 7/2012 | Kalb et al. |
| 2012/0215911 | A1 | 8/2012 | Raleigh et al. |
| 2012/0226819 | A1 | 9/2012 | Sylvain |
| 2013/0006743 | A1 | 1/2013 | Moore et al. |
| 2013/0018714 | A1 | 1/2013 | George |
| 2013/0060631 | A1 | 3/2013 | Corson et al. |
| 2013/0139264 | A1 | 5/2013 | Brinkley et al. |
| 2013/0211925 | A1 | 8/2013 | Holland |
| 2013/0211941 | A1 | 8/2013 | Hallowell et al. |
| 2013/0304586 | A1 | 11/2013 | Angles et al. |
| 2013/0311293 | A1 | 11/2013 | Ward et al. |
| 2013/0331027 | A1 | 12/2013 | Rose et al. |
| 2014/0059141 | A1 | 2/2014 | Belkin et al. |
| 2014/0066029 | A1 | 3/2014 | Brennan et al. |
| 2014/0080467 | A1 | 3/2014 | Urbanek |
| 2014/0089113 | A1 | 3/2014 | Desai et al. |
| 2014/0136314 | A1 | 5/2014 | Kiet et al. |
| 2014/0162685 | A1 | 6/2014 | Edge |
| 2014/0278953 | A1 | 9/2014 | Ismail et al. |
| 2014/0379448 | A1 | 12/2014 | Gregory |
| 2014/0379467 | A1 | 12/2014 | Huang et al. |
| 2015/0074204 | A1 | 3/2015 | Burcham et al. |
| 2015/0121418 | A1 | 4/2015 | Jain et al. |

FOREIGN PATENT DOCUMENTS

| | | | |
|---|---|---|---|
| WO | WO2013126759 | A2 | 8/2013 |
| WO | WO2015038562 | A1 | 3/2015 |

OTHER PUBLICATIONS

Arivukkarasu, Anand, et al., entitled "Telecom Services to Support Retail Fuel Stocking Logistics," filed Nov. 12, 2014, U.S. Appl. No. 14/539,715.

Decision on Appeal dated Apr. 28, 2015, U.S. Appl. No. 11/438,540, filed May 22, 2006.

Office Action dated Feb. 25, 2015, U.S. Appl. No. 11/474,880, filed Jun. 26, 2006.

Final Office Action date Mar. 2, 2015, U.S. Appl. No. 11/557,939, filed Nov. 8, 2006.

Examiner's Answer dated Mar. 12, 2015, U.S. Appl. No. 12/259,187, filed Oct. 27, 2008.

FAIPP Pre-Interview Communication dated Apr. 3, 2015, U.S. Appl. No. 14/150,832, filed Jan. 9, 2014.

Thierer, et al., "Privacy Solutions (Part 2): Adblock Plus," Technology Liberation Front, Sep. 8, 2008, on line at techliberation.com.

Burcham, Robert H., et al., entitled "IP Address Hashing in Advertisement Gateway," filed on Jan. 21, 2014, U.S. Appl. No. 14/160,196.

Burcham, Robert H., et al., entitled "Client Mediation and Integration to Advertisement Gateway," filed on Jan. 21, 2014, U.S. Appl. No. 14/160,206.

Burcham, Robert H., et al., entitled "Address Modification for Advertisement Mediation," filed on Jan. 21, 2014, U.S. Appl. No. 14/160,215.

Burcham, Robert H., et al., entitled "Advertisement Mediation of Supply-Demand Communications," filed on Jan. 21, 2014, U.S. Appl. No. 14/160,224.

Delker, Jason R., et al., entitled, "Enhanced Dialer for a Mobile Communication Device," filed Mar. 4, 2015, U.S. Appl. No. 14/639,057.

Ferrante, Piero D., et al., entitled, "System and Method for Subscriber Cluster Synthesis," filed Feb. 11, 2015, U.S. Appl. No. 14/619,689.

Advisory Action dated Oct. 29, 2015, U.S. Appl. No. 11/474,880, filed Jun. 26, 2006.

Supplemental Advisory Action dated Nov. 2, 2015, U.S. Appl. No. 11/474,880, filed Jun. 26, 2006.

Advisory Action date May 18, 2015, U.S. Appl. No. 11/557,939, filed Nov. 8, 2006.

Office Action date Dec. 17, 2015, U.S. Appl. No. 11/557,939, filed Nov. 8, 2006.

FAIPP Pre-Interview Communication dated Nov. 18, 2015, U.S. Appl. No. 14/024,629, filed Sep. 11, 2013.

Notice of Allowance dated Dec. 16, 2015, U.S. Appl. No. 13/956,367, filed Aug. 1, 2013.

Final Office Action dated Oct. 29, 2015, U.S. Appl. No. 14/150,832, filed Jan. 9, 2014.

Advisory Action dated Jan. 7, 2016, U.S. Appl. No. 14/150,832, filed Jan. 9, 2014.

First Action Interview Office Action dated Dec. 17, 2015, U.S. Appl. No. 14/494,601, filed Sep. 24, 2014.

Notice of Allowance dated Jan. 28, 2016, U.S. Appl. No. 14/024,629, filed Sep. 11, 2013.

FAIPP Pre-Interview Communication dated Apr. 15, 2016, U.S. Appl. No. 13/911,074, filed Jun. 5, 2013.

FAIPP Pre-Interview Communication dated Feb. 16, 2016, U.S. Appl. No. 14/245,822, filed Apr. 4, 2014.

Foreign Communication from a Related Counterpart—Preliminary Report on Patentability dated Mar. 24, 2016, PCT/US14/54877, filed on Sep. 10, 2014.

Hannebaum, Ryan K., et al., entitled, "Advertisement Campaign Target Selection Engine," filed Apr. 4, 2014, U.S. Appl. No. 14/245,822.

Final Office Action dated May 3, 2016, U.S. Appl. No. 11/557,939, filed Nov. 8, 2006.

Restriction Requirement dated May 19, 2016, U.S. Appl. No. 14/024,627, filed Sep. 11, 2013.

Office Action dated May 17, 2016, U.S. Appl. No. 14/150,832, filed Jan. 9, 2014.

(56) References Cited

OTHER PUBLICATIONS

First Action Interview Office Action dated Apr. 28, 2016, U.S. Appl. No. 14/245,822, filed Apr. 4, 2014.
Office Action dated Jul. 1, 2016, U.S. Appl. No. 14/165,569, filed Jan. 27, 2014.
Office Action dated Jul. 14, 2016, U.S. Appl. No. 14/165,571, filed Jan. 27, 2014.
Final Office Action dated Apr. 28, 2016, U.S. Appl. No. 14/494,601, filed Sep. 24, 2014.
Notice of Allowance dated Jul. 22, 2016, U.S. Appl. No. 14/494,601, filed Sep. 24, 2014.
Burcham, Robert H., et al., entitled "Swipe Screen Advertisement Metrics and Tracking," filed on Nov. 27, 2013, U.S. Appl. No. 61/910,001.
Burcham, Robert H., et al., entitled "Swipe Screen Advertisement Metrics and Tracking," filed on Jan. 27, 2014, U.S. Appl. No. 14/165,569.
Delker, Jason R., et al., entitled "Ad Management Using Ads Cached on a Mobile Electronic Device," filed on Nov. 27, 2013, U.S. Appl. No. 61/910,002.
Delker, Jason R., et al., entitled "Ad Management Using Ads Cached on a Mobile Electronic Device," filed on Jan. 27, 2014, U.S. Appl. No. 14/165,571.
FAIPP Office Action dated Aug. 24, 2016, U.S. Appl. No. 13/911,074, filed Jun. 5, 2013.
Office Action dated Aug. 24, 2016, U.S. Appl. No. 14/160,196, filed Jan. 21, 2014.
FAIPP Pre-Interview Communication dated Aug. 4, 2016, U.S. Appl. No. 14/160,206, filed Jan. 21, 2014.
FAIPP Office Action dated Oct. 21, 2016, U.S. Appl. No. 14/160,206, filed Jan. 21, 2014.
FAIPP Pre-Interview Communication dated Aug. 25, 2016, U.S. Appl. No. 14/160,215, filed Jan. 21, 2014.
FAIPP Office Action dated Oct. 21, 2016, U.S. Appl. No. 14/160,215, filed Jan. 21, 2014.
FAIPP Pre-Interview Communication dated Sep. 19, 2016, U.S. Appl. No. 14/160,224, filed Jan. 21, 2014.
FAIPP Office Action dated Oct. 21, 2016, U.S. Appl. No. 14/160,224, filed Jan. 21, 2014.
Final Office Action dated Jun. 29, 2010, U.S. Appl. No. 11/558,021, filed Nov. 9, 2006, 28 pages.
Advisory Action dated Sep. 22, 2010, U.S. Appl. No. 11/558,021, filed Nov. 9, 2006, 3 pages.
Office Action dated Jun. 13, 2013, U.S. Appl. No. 11/558,021, filed Nov. 9, 2006.
Final Office Action dated Dec. 26, 2013, U.S. Appl. No. 11/558,021, filed Nov. 9, 2006.
Advisory Action dated Feb. 20, 2014, U.S. Appl. No. 11/558,021, filed Nov. 9, 2006, 3 pages.
Examiner's Answer dated Aug. 26, 2014, U.S. Appl. No. 11/558,021, filed Nov. 9, 2006.
Office Action dated Aug. 30, 2010, U.S. Appl. No. 11/557,939, filed Nov. 8, 2006, 52 pages.
Final Office Action dated Jan. 13, 2011, U.S. Appl. No. 11/557,939, filed Nov. 8, 2006.
Advisory Action dated Mar. 22, 2011, U.S. Appl. No. 11/557,939, filed Nov. 8, 2006.
Office Action dated Oct. 31, 2013, U.S. Appl. No. 11/557,939, filed Nov. 8, 2006.
Office Action dated Aug. 5, 2014, U.S. Appl. No. 11/557,939, filed Nov. 8, 2006.
Office Action dated Sep. 30, 2010, U.S. Appl. No. 11/617,703, filed Dec. 28, 2006.
Final Office Action dated Mar. 25, 2011, U.S. Appl. No. 11/617,703, filed Dec. 28, 2006.
Advisory Action dated Jun. 7, 2011, U.S. Appl. No. 11/617,703, filed Dec. 28, 2006.
Notice of Allowance dated Aug. 1, 2012, U.S. Appl. No. 11/617,703, filed Dec. 28, 2006.
Office Action dated Jul. 21, 2011, U.S. Appl. No. 12/259,187, filed Oct. 27, 2008.
Final Office Action dated Dec. 12, 2011, U.S. Appl. No. 12/259,187, filed Oct. 27, 2008.
Advisory Action dated Feb. 29, 2012, U.S. Appl. No. 12/259,187, filed Oct. 27, 2008.
Office Action dated Dec. 6, 2013, U.S. Appl. No. 12/259,187, filed Oct. 27, 2008.
Final Office Action dated May 27, 2014, U.S. Appl. No. 12/259,187, filed Oct. 27, 2008.
Advisory Action dated Aug. 6, 2014, U.S. Appl. No. 12/259,187, filed Oct. 27, 2008.
Lightningcast, Inc., "Lightningcast Mobile Video Advertising Solution," May 2, 2005, 14 pgs.
Connelly, Francis J., et al., "The Life Cycle Concept as a Long Term Forecasting Model", Academy of Marketing Journal (pre-1986); pp. 455-464, Summer 1974, 2, 3, ABI/INFORM Global.
Fisher, Marshall, et al., Accurate Retail Testing of Fashion Mechandise: Methodology and Application, Marketing Science, vol. 19, No. 3, pp. 266-278, Summer 2000, ABI/INFORM Global.
Kurawarwala, Abbas A., et al., "Forecasting and Inventory Management of Short Life-Cyle Products", Operations Research, vol. 44, No. 1, Jan.-Feb. 1996, pp. 131-150, Informs.
Stratman, Scott, "Allstockedup", Industrial Distribution, vol. 89, No. 11, Nov. 2000, pp. 92-96, ABI/INFORM Global.
Vijayan, Jaikumar, "IBM Service Follows Products After Delivery", Computerworld, vol. 35, No. 28, p. 14, Jul. 9, 2001, ABI/INFORM Global.
Sterling, Greg, "Google Replacing "Android ID" with"Advertising ID" Similar to Apple's IDFA," http://marketingland.com/google-replacing-android-id-with-advertising-id-similar-to-apples-idfa-63636, posted Oct. 31, 2013.
Janssen, Cory, "Identifier for Advertisers (IFA)," http://www.techopedia.com/definition/29032/identifier-for-advertisers-ifa-ifda, Apr. 3, 2014, last accessed Feb. 10, 2015.
The iPhone Wiki, "UDID," http://theiphonewiki.com/wiki/UDID, Apr. 3, 2014, last accessed Feb. 10, 2015.
Google Developer Android, "Advertising ID," http://developer.android.com/google/play-services/id.html, Apr. 3, 2014, last accessed Feb. 10, 2015.
Wikipedia, "Real-time Bidding," http://en.wikipedia.org/wiki/Real-time_bidding, Apr. 3, 2014, last accessed Feb. 10, 2015.
Reynolds, Kevin, "Are Ad Exchanges and Real Time Bidding the Next Big Thing?,"http://www.advertisingperspectives.com/adblog/media-activation/are-ad-exchanges-and-real-time-bidding-the-next-big-thing/, Apr. 3, 2014, last accessed Feb. 10, 2015.
Foreign Communication from a Related Counterpart—International Search Report and Written Opinion, dated Dec. 24, 2014, PCT/US14/54877, filed on Nov. 11, 2014.
Barnes, James D., et al., entitled, "Systems and Methods for State-Based Advertisement Messaging Across Media Types," filed May 22, 2006, U.S. Appl. No. 11/438,540.
Barnes, James D., et al., entitled, "In-Flight Campaign Optimization," filed Nov. 9, 2006, U.S. Appl. No. 11/558,021.
Barnes, James D., et al., entitled "Mobile-Device-Based Coupon Management Systems and Methods," filed Apr. 13, 2006, U.S. Appl. No. 11/403,614.
Barnes, James D., et al., entitled, "Inventory Management Integrating Subscriber and Targeting Data," Jun. 26, 2006, U.S. Appl. No. 11/474,880.
Barnes, James D., et al., entitled, "Behavioral Analysis Engine for Profiling Wireless Subscribers," filed Nov. 8, 2006, U.S. Appl. No. 11/557,939.
Barnes, James D., et al., entitled, "Advertisement Inventory Management," filed Oct. 27, 2008, U.S. Appl. No. 12/259,187.
Martin, Geoff S., et al., entitled, "Method and System for Providing Custom Background-Downloads," filed Nov. 16, 2007, U.S. Appl. No. 11/280,576.
McConnell, Von K. et al., entitled, "Method and System Using Location History for Targeted Coupon Distribution," filed May 17, 2000, U.S. Appl. No. 09/572,282.

(56) References Cited

OTHER PUBLICATIONS

Weaver, Farni, et al., "Method and System for Facilitating Determination of Call-Drop Locations in a Wireless Network," filed Sep. 9, 2003, U.S. Appl. No. 10/658,353.
Burcham, Robert H., et al., entitled "System and Method for Identifying a Mobile Device with Near Real Time Visualization to Action," filed Sep. 11, 2013, U.S. Appl. No. 14/024,627.
Burcham, Robert H., et al., entitled "System and Method to Generate an Abstract Advertisement Campaign Management and Implement Policy Enforcement," filed Sep. 11, 2013, U.S. Appl. No. 14/024,629.
Burcham, Robert H., et al., entitled "System and Method to Generate an Abstract Advertisement Campaign Management and Implement Policy Enforcement," filed Sep. 10, 2014, PCT Application Serial No. PCT/US2014/054877.
Burcham, Robert H., et al., entitled "Methods and Systems of Generating a Unique Mobile Device Identifier," filed Aug. 1, 2013, U.S. Appl. No. 13/956,367.
Holmes, Geoffrey A., entitled "Methods and Systems of Collecting and Segmenting Device Sensor Data for Mobile Device Identification," filed Jun. 5, 2013, U.S. Appl. No. 13/911,074.
Belser, John E., et al., entitled "Ad Management Using Ads Cached on a Mobile Electronic Device," filed Jan. 9, 2014, U.S. Appl. No. 14/150,832.
Katzer, Robin D., et al., entitled "Advertisement Dynamic Queue Management," filed Apr. 10, 2014, U.S. Appl. No. 14/250,381.
Office Action—Restriction requirement dated Jun. 17, 2008, U.S. Appl. No. 11/405,195, filed Apr. 17, 2006, 7 pages.
Office Action dated Aug. 15, 2008, U.S. Appl. No. 11/405,195, filed Apr. 17, 2006, 12 pages.
Final Office Action dated Feb. 26, 2009, U.S. Appl. No. 11/405,195, 17 pages.
Advisory Action dated May 7, 2009, U.S. Appl. No. 11/405,195, 2 pages.
Office Action dated Aug. 18, 2009, U.S. Appl. No. 11/405,195, 17 pages.
Final Office Action dated Oct. 27, 2010, U.S. Appl. No. 11/405,195, filed Apr. 17, 2006.
Office Action dated Feb. 8, 2011, U.S. Appl. No. 11/405,195, filed Apr. 17, 2006.
Final Office Action dated Jul. 22, 2011, U.S. Appl. No. 11/405,195, filed Apr. 17, 2006.
Advisory Action dated Oct. 14, 2011, U.S. Appl. No. 11/405,195, filed Apr. 17, 2006.
Office Action dated Apr. 6, 2012, U.S. Appl. No. 11/405,195, filed Apr. 17, 2006.
Notice of Allowance dated Dec. 6, 2012, U.S. Appl. No. 11/405,195, filed Apr. 17, 2006.
Office Action dated Feb. 27, 2009, U.S. Appl. No. 11/433,301, filed May 12, 2006, 13 pages.
Notice of Allowance dated Oct. 26, 2009, U.S. Appl. No. 11/433,301, filed May 12, 2006, 7 pages.
Notice of Allowance dated Mar. 5, 2012, U.S. Appl. No. 12/686,188, filed Jan. 12, 2010.
Office Action dated Jun. 17, 2008, U.S. Appl. No. 11/403,614, filed Apr. 13, 2006, 7 pages.
Office Action dated Aug. 27, 2008, U.S. Appl. No. 11/403,614, filed Apr. 13, 2006, 11 pages.
Final Office Action dated Mar. 4, 2009, U.S. Appl. No. 11/403,614, filed Apr. 13, 2006, 12 pages.
Advisory Action dated May 7, 2009, U.S. Appl. No. 11/403,614, filed Apr. 13, 2006, 3 pages.
Office Action dated Aug. 20, 2009, U.S. Appl. No. 11/403,614, filed Apr. 13, 2006, 11 pages.
Final Office Action dated Nov. 8, 2010, U.S. Appl. No. 11/403,614, filed Apr. 13, 2006.
Office Action dated Dec. 3, 2012, U.S. Appl. No. 11/403,614, filed Apr. 13, 2006.
Final Office Action dated Jun. 10, 2013, U.S. Appl. No. 11/403,614, filed Apr. 13, 2006.
Advisory Action dated Aug. 22, 2013, U.S. Appl. No. 11/403,614, filed Apr. 13, 2006.
Office Action dated Nov. 3, 2008, U.S. Appl. No. 11/438,540, filed May 22, 2006, 14 pages.
Final Office Action dated Apr. 28, 2009, U.S. Appl. No. 11/438,540, filed May 22, 2006, 16 pages.
Advisory Action dated Jul. 10, 2009, U.S. Appl. No. 11/438,540, filed May 22, 2006, 3 pages.
Office Action dated Oct. 16, 2009, U.S. Appl. No. 11/438,540, filed May 22, 2006, 12 pages.
Final Office Action dated Apr. 20, 2010, U.S. Appl. No. 11/438,540, filed May 22, 2006, 26 pages.
Advisory Action dated Jul. 2, 2010, U.S. Appl. No. 11/438,540, filed May 22, 2006, 4 pages.
Office Action dated Oct. 14, 2010, U.S. Appl. No. 11/438,540, filed May 22, 2006.
Final Office Action dated Mar. 30, 2011, U.S. Appl. No. 11/438,540, filed May 22, 2006.
Examiner's Answer dated Oct. 27, 2011, U.S. Appl. No. 11/438,540, filed May 22, 2006.
Office Action dated Nov. 14, 2008, U.S. Appl. No. 11/474,880, filed Jun. 26, 2006, 17 pages.
Final Office Action dated May 28, 2009, U.S. Appl. No. 11/474,880, filed Jun. 26, 2006, 23 pages.
Advisory Action dated Oct. 19, 2009, U.S. Appl. No. 11/474,880, filed Jun. 26, 2006, 4 pages.
Advisory Action (corrected) dated Oct. 27, 2009, U.S. Appl. No. 11/474,880, filed Jun. 26, 2006, 4 pages.
Office Action dated Mar. 5, 2010, U.S. Appl. No. 11/474,880, filed Jun. 26, 2006, 24 pages.
Final Office Action dated Aug. 18, 2010, U.S. Appl. No. 11/474,880, filed Jun. 26, 2006, 20 pages.
Office Action dated Mar. 30, 2011, U.S. Appl. No. 11/474,880, filed Jun. 26, 2006.
Final Office Action dated Sep. 7, 2011, U.S. Appl. No. 11/474,880, filed Jun. 26, 2006.
Advisory Action dated Nov. 15, 2011, U.S. Appl. No. 11/474,880, filed Jun. 26, 2006.
Examiner's Answer dated May 1, 2012, U.S. Appl. No. 11/474,880, filed Jun. 26, 2006.
Decision on Appeal dated Nov. 18, 2014, U.S. Appl. No. 11/474,880, filed Jun. 26, 2006.
Office Action dated Feb. 4, 2009, U.S. Appl. No. 11/491,387, filed Jul. 21, 2006, 9 pages.
Final Office Action dated Aug. 6, 2009, U.S. Appl. No. 11/491,387, filed Jul. 21, 2006, 13 pages.
Advisory Action dated Oct. 19, 2009, U.S. Appl. No. 11/491,387, filed Jul. 21, 2006, 4 pages.
Examiner's Answer dated Nov. 8, 2010, U.S. Appl. No. 11/491,387, filed Jul. 21, 2006.
Decision on Appeal dated Oct. 9, 2012, U.S. Appl. No. 11/491,387, filed Jul. 21, 2006.
Notice of Allowance dated Jan. 8, 2013, U.S. Appl. No. 11/491,387, filed Jul. 21, 2006.
Office Action dated Jan. 6, 2010, U.S. Appl. No. 11/558,021, filed Nov. 9, 2006, 7 pages.
Notice of Allowance dated Jul. 16, 2015, U.S. Appl. No. 11/438,540, filed May 22, 2006.
Final Office Action dated Aug. 31, 2015, U.S. Appl. No. 11/474,880, filed Jun. 26, 2006.
FAIPP Pre-Interview Communication dated Sep. 23, 2015, U.S. Appl. No. 13/956,367, filed Aug. 1, 2013.
FAIPP Office Action dated Jul. 2, 2015, U.S. Appl. No. 14/150,832, filed Jan. 9, 2014.
FAIPP Pre-Interview Communication dated Sep. 18, 2015, U.S. Appl. No. 14/494,601, filed Sep. 2014.
Wikipedia, "Foursuare," https://en.wikipedia.org/w/index.php?title=Foursquare&oldid=681836736, Mar. 2009, last accessed on Sep. 25, 2015.
Belser, John E., et al., entitled "End User Participation in Mobile Advertisement," filed Sep. 24, 2014, U.S. Appl. No. 14/494,601.
Final Office Action dated Dec. 14, 2016, U.S. Appl. No. 13/911,074, filed Jun. 5, 2013.

(56) References Cited

OTHER PUBLICATIONS

Advisory Action dated Feb. 22, 2107, U.S. Appl. No. 13/911,074, filed Jun. 5, 2013.
Final Office Action dated Feb. 24, 2017, U.S. Appl. No. 14/160,196, filed Jan. 21, 2014.
Final Office Action dated May 11, 2017, U.S. Appl. No. 14/160,196, filed Jan. 21, 2014.
Final Office Action dated Mar. 24, 2017, U.S. Appl. No. 14/160,206, filed Jan. 21, 2014.
Final Office Action dated May 4, 2017, U.S. Appl. No. 14/160,215, filed Jan. 21, 2014.
Final Office Action dated May 5, 2017, U.S. Appl. No. 14/160,224, filed Jan. 21, 2014.
Advisory Action dated Jul. 26, 2017, U.S. Appl. No. 14/160,196, filed on Jan. 21, 2014.
Notice of Allowance dated Jul. 26, 2017, U.S. Appl. No. 14/160,206, filed on Jan. 21, 2014.
Advisory Action dated Jul. 26, 2017, U.S. Appl. No. 14/160,215, filed on Jan. 21, 2014.
Advisory Action dated Jul. 26, 2017, U.S. Appl. No. 14/160,224, filed on Jan. 21, 2014.

\* cited by examiner

METHOD FOR CONSUMER PROFILE CONSOLIDATION USING MOBILE NETWORK IDENTIFICATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile telephones are electronic devices that are used for mobile voice and/or data communications based on wireless network connectivity, which can be provided by base stations known as cell towers or sites. Such electronic devices may be associated with a mobile network identifier, such as a subscriber identifier, a device identifier, a network access identifier (NAI), a MAC address number, or another type of identifier by a wireless communications service provider. Mobile telephones and similar electronic/communications devices may be identified by third party servers other than a server maintained by a wireless communications service provider with a third party identifier assigned by the third party, and the third party identifier may be different from the mobile network identifier.

SUMMARY

In an embodiment, a method of consolidating consumer profiles based on mapping an external identifier of a mobile communication device to a mobile network identification by an authentication network element computer is disclosed. The method comprises receiving, by an advertisement (ad) bidder server computer, an ad bid request with an external consumer identifier and consumer profile information of a mobile communication device and transmitting a bid response with a pixel tag embedded in the bid response, wherein the external consumer identifier is embedded in the pixel tag. The method further comprises receiving, by a mobile communication network, a pixel tag request from the mobile communication device with the external consumer identifier embedded in the pixel tag request, wherein the mobile communication network is maintained by a mobile network carrier that maintains the ad bidder. The method further comprises identifying a mobile network identification of the mobile communication device by the mobile communication network, storing a mapping between the external consumer identifier and the mobile network identification, and mapping the external consumer identifier to an internal consumer profile maintained by the mobile communication network based on the mapping between the external consumer identifier and the mobile network identification. The method further comprises updating the internal consumer profile based on the consumer profile information embedded in the ad bid request.

In an embodiment, a method of consolidating consumer profiles based on mapping an external identifier of a mobile communication device to a mobile network identification by an authentication network element computer is disclosed. The method comprises receiving, by an advertisement (ad) bidder server computer, an ad bid request with an external consumer identifier and consumer profile information of a mobile communication device, and storing the consumer profile information and the external consumer identifier embedded in the ad bid request in a data store. The method further comprises transmitting a bid response with a pixel tag encoded and embedded in the bid response, wherein the external consumer identifier is embedded in the pixel tag and receiving, by a mobile communication network, a pixel tag request from the mobile communication device with the external consumer identifier embedded in the pixel tag request, wherein the mobile communication network is maintained by a mobile network carrier that maintains the ad bidder. The method further comprises identifying a mobile network identification of the mobile communication device by the mobile communication network, storing a mapping between the external consumer identifier and the mobile network identification, and mapping the external consumer identifier to an internal consumer profile maintained by the mobile communication network based on the mapping between the external consumer identifier and the mobile network identification. The method further comprises updating the internal consumer profile based on the consumer profile information embedded in the ad bid request and selecting an advertisement to be transmitted to the mobile communication device based on the updated internal consumer profile when the ad bidder s a second ad auction, whereby more highly targeted advertisement selection for the mobile communication device is promoted by combining consumer profile information stored by the application on the mobile communication device and internal consumer profile information maintained by the mobile network carrier.

In an embodiment, a method of consolidating consumer profiles based on mapping an external identifier of a mobile communication device to a mobile network identification by an authentication network element computer is disclosed. The method comprises receiving, by an advertisement (ad) bidder server computer, an ad bid request with an external consumer identifier of a mobile communication device and transmitting a bid response with the external consumer identifier embedded in the bid response. The method further comprises receiving, by a mobile communication network, a request from the mobile communication device with the external consumer identifier embedded in the request, identifying a mobile network identification of the mobile communication device by the mobile communication network, and storing a mapping of the external consumer identifier to the mobile network identification.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
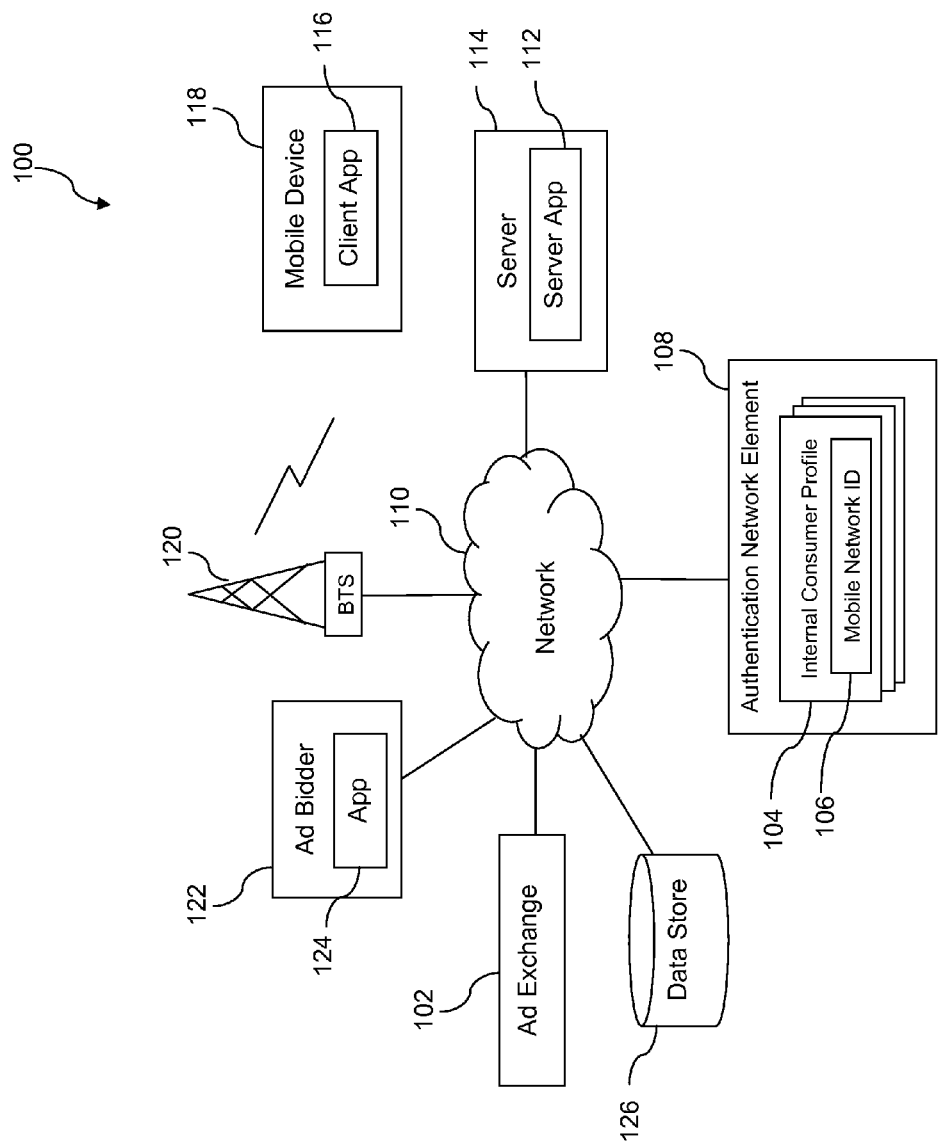
FIG. 1 is an illustration of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

In the current online advertising world, multiple identifiers may be assigned to a given consumer, a user, or a subscriber of an electronic device based on the manner the consumer is interacting with the advertisements (ads). In the mobile applications field, consumer identifiers may be assigned to consumers for advertising purposes, for example an apple identifier for advertisers (IDFA) on an Apple mobile device or an Android advertising identifier on an Android mobile device. In the mobile web field, cookies, the hypertext markup language 5 (HTML5) memory, or an internet protocol (IP) address may be used to identify a consumer.

Each mobile application or mobile browser on a single mobile communication device may keep a consumer profile for each consumer identifier that the mobile application or mobile browser assigned to the mobile communication device. A consumer profile may comprise at least one of the age, gender, location, hobby, shopping preference of a user or a subscriber of the mobile communication device. A consumer profile may be used to conduct targeted online advertising. The targeted online advertising is typically more effective in eliciting click-throughs and promoting sales. A click-through rate of an ad is defined as the number of clicks on an ad divided by the number of times the ad is shown (impressions), expressed as a percentage. The click-through rate measures the proportion of visitors who initiated action with respect to an ad that redirected them to another web page where they might purchase an item or learn more about a product or service.

To an advertiser, an ad network, or an agency on behalf of an advertiser, a single consumer may appear to be multiple consumers due to the various identifier mechanisms and this may make advertising less effective. For example, consumer identifier(s) assigned to a user or a mobile communication device by mobile applications or browsers that associate with or cooperate with other advertisers, other ad networks, or ad agencies may seem to an advertiser, an ad network, or an ad agency as with other user(s) or other mobile communication device(s). By aggregating (partial) consumer profiles of an individual, each indexed by a different identity, a more effective and complete profile may be created that enhances the targeted advertising. Thus, it may be desirable to link the multiple consumer profiles of the mobile communication device to make the targeted advertising more effective.

The present disclosure teaches a system and method for consolidating multiple consumer profiles for one mobile communication device or for one user of a mobile communication device using a mobile network identification. For example, when an ad bidder, maintained by a wireless communications service provider or a mobile network carrier, receives an ad bid request with an external consumer identifier and consumer profile information from an ad exchange in an ad auction, the ad bidder may respond with a bid response with a pixel tag encoded and/or embedded in the bid response. An ad bidder may be a computer server that participates in ad bidding, for example in mobile ad impression bidding, at an ad exchange. An application on the ad bidder may store the external consumer identifier with the consumer profile information in a data store that is maintained by the mobile network carrier, for example by creating/accessing an entry based on the external consumer identifier. The pixel tag may be encoded and/or embedded in the bid response. The external consumer identifier may be embedded in the pixel tag and transmitted to the mobile communication device that the ad impression bidding is for. Note that although a mobile network is discussed throughout the disclosure as a preferred embodiment, technologies discussed in this disclosure may also be applied to other types of networks, for example a WiFi network or a wired network, where electronic devices may be authenticated before authorized to use network services.

A pixel tag, also called a web beacon, a web bug, or a clear graphic interchange format (GIF), is an often-transparent graphic image, usually no larger than 1 pixel×1 pixel. A pixel tag may be used in a hypertext transfer protocol (http) message to create an http transaction. The ad bid request and bid response above may be http messages. The pixel tag may not provide any visual effect to a web page, but instead may provide analytics for improved ad targeting or other web personalization.

For example, a pixel tag may be used to monitor the behavior of a user visiting a web site, for example to count ad experiences pursuant to an advertiser paying a toll per experience. When the hypertext markup language (html) code for the pixel tag points to a site to retrieve the image, at the same time it may pass along information such as the type of browser that retrieved the image, the internet protocol (IP) address of the mobile communication device that retrieved the image, the time the pixel tag was viewed and for how long, or another type of information. The pixel tag may be in a specific format, for example encoded in a specific format, and the specific format may be used by a mobile communication network to differentiate a pixel image request from other messages received at the mobile communication network. For example, the pixel tag may serve as a trigger for the mobile communication network to detect and/or analyze an http message with the pixel tag.

When the ad bidder wins the ad auction, an ad response may be transmitted by the ad exchange to the mobile communication device. A pixel image request may be transmitted by the mobile communication device after the ad response is received at the mobile communication device. When the pixel image request from the mobile communication device is received at the mobile communication network, for example by an authentication network element, the authentication network element may identify a mobile network identification (ID) of the mobile communication device. The authentication network element may extract the external consumer identifier embedded in the pixel tag of the pixel image request. The authentication network element may transmit a notification to a server application indicating a mapping from the mobile network ID to the external consumer identifier.

The server application may store the mapping of the external consumer identifier and the mobile network ID, for example in the data store. The server application may map the external consumer identifier to an internal consumer profile maintained by the mobile communication network based on the mapping between the external consumer identifier and the mobile network identification. The server application may update the internal consumer profile based on the consumer profile information embedded in the ad bid request that was stored to the data store, for example by accessing the entry in the data store based on the external consumer identifier.

Later on, the ad bidder may receive a second ad bid request for the same external consumer identifier and win the second ad auction. For example, the ad bidder or the application on the ad bidder may locate a corresponding internal consumer profile based on a mobile network ID that was mapped to the external consumer identifier. Based on the located internal consumer profile, the ad bidder may adapt a bidding price to offer to the ad exchange. The ad bidder may select an ad to be transmitted to the mobile communication device based on the updated internal consumer profile when the ad bidder wins the second ad auction for the same external consumer identifier. For example, when the ad bidder wins a second ad auction for the same external consumer identifier, the authentication network element may obtain the external consumer identifier and/or the corresponding mobile network ID for the mobile communication device. The external consumer identifier and the mobile network ID may be transmitted by the authentication network element to the server application. The server application may compare the mapping of the external consumer identifier and the mobile network ID to the stored mapping of the external consumer identifier to the stored mobile network ID, for example to confirm whether or not the mapping stays valid. Said in other words, the server application may compare the mapping of the external consumer identifier to the mobile network ID to the stored mapping of the external consumer identifier to the stored mobile network ID to confirm whether or not the stored mobile network ID is still valid for the external consumer identifier. Alternatively, the server application may locate a record in the data store with the external consumer identifier and compare the mobile network ID with the stored mobile network ID.

When the mapping from the external consumer identifier to the mobile network ID and the stored mapping from the external consumer identifier to the stored mobile network ID match, the stored mobile network ID is still valid for the same external consumer identifier. The server application may then update the internal consumer profile based on consumer profile information embedded in the second ad bid request received from the ad exchange. The consumer profile information embedded in the second ad bid request may have been stored in the data store by the application on the ad bidder upon the receipt of the second ad bid request, for example by retrieving the entry in the data store based on the external consumer identifier.

On the other hand, when the mapping from the external consumer identifier to the mobile network ID and the stored mapping from the external consumer identifier to the stored mobile network ID do not match, the stored mobile network ID is no longer valid for the same external consumer identifier. The stored mapping of the external consumer identifier to the mobile network ID may be removed by the server application. The mapping of the external consumer identifier to the mobile network ID may be stored by the server app. The new internal consumer profile associated with the mobile network ID may be updated by the server application based on the consumer profile information from the second ad bid request.

The server application may build a behavioral profile and/or a usage-based profile for each consumer. For example, pixel image requests from an angry birds application, a wall street journal (WSJ) application, a Facebook application, or another application on the mobile communication may be analyzed, the external consumer identifier may be extracted, and related consumer profile information may be added to the internal consumer profile. Behavior, usage, and/or location information may also be added to the internal consumer profile, for example how many times the consumer has opened a specific application within a predefined period of time.

Even if the ad bidder does not win an ad auction for a mobile communication device with a specific external consumer identifier and thus the mobile communication device may not be identified by the mobile communication network, consumer profile information may still be stored for statistics analysis purposes. For example, an advertiser, an advertisement agency, or the mobile network carrier may desire to know user behavior statistics such as what other applications users of a specific application may also use. Alternatively, when the ad bidder loses an ad auction for a mobile communication device, consumer profile information may be stored, for example in the data store, as pending with a corresponding external consumer identifier. When the ad bidder wins an ad auction for the mobile communication device for the first time after losing an ad auction for the mobile communication device, the stored pending consumer profile information may be stored with a corresponding mobile network ID.

By aggregating behavior history associated with disparate third party assigned consumer identifiers and a single mobile network ID in a single consumer profile, a more robust, valuable, more comprehensive consumer profile may be built more rapidly. More highly targeted advertisement selection for a mobile communication device may be promoted by combining consumer profile information stored by applications on the mobile communication device and internal consumer profile information maintained by a mobile network carrier. Higher click-through rates may be achieved with more highly targeted advertisement.

Turning now to FIG. 1, a communication system 100 is described. In an embodiment, the communication system 100 comprises an ad exchange platform 102, a plurality of mobile communication devices 118, a server 114, a data store 126, an advertisement (ad) bidder 122, and an authentication network element 108. The mobile device 118 may comprise a client application 116. The ad bidder 122 may comprise an application 124. The server 114 may comprise a server application 112. The ad exchange platform 102, the server 114, the ad bidder 122, and the authentication network element 108 may be implemented as computers or computer systems. Computer systems are discussed further hereinafter. In some contexts, the authentication network element 108 may be referred to as an authentication network element computer.

The authentication network element 108 may comprise a plurality of internal consumer profiles 104. Each internal consumer profile 104 may comprise a mobile network identification (ID) 106, for example a subscriber identifier, a device identifier, a network access identifier (NAI), a MAC address number, or another type of identifier. The mobile network ID 106 may be an identification used by a wireless communications service provider or a mobile network carrier to identify a mobile communication device 118. The mobile device 118 may be configured to use a radio transceiver to establish a wireless communication link with a base transceiver station (BTS) 120, and the base transceiver station 120 may provide communications connectivity of the mobile device 118 to a network 110. The ad exchange 102, the ad bidder 122, the data store 126, the authentication network element 108, and the server 114 may also have access to the network 110. The network 110 may comprise any combination of private and public networks.

It is understood that the system 100 may comprise any number of mobile devices 118, any number of base transceiver stations 120, any number of servers 114, any number of ad bidders 122, any number of ad exchanges 102, and any number of data stores 126. The collectivity of base transceiver stations 120 may be said to comprise a radio access network, in that these base transceiver stations 120 may provide a radio communication link to the mobile devices 118 to provide access to the network 110. The server 114 may be a server performing data recording and/or forwarding functionality that is maintained by a mobile network carrier. The ad bidder 122 may be an ad bidding server computer maintained by the mobile network carrier, for example for mobile ad impression bidding, or may be maintained by a third party. The ad bidder 122 may participate in ad impression bidding, for example in mobile ad impression bidding, at an ad exchange 102. While the present disclosure describes an ad bidding use case, it will be appreciated that the teachings of the present disclosure can be applied to other use cases. For example, in another embodiment, the system 100 may be used to provide general mediation and/or registration functions.

The authentication network element 108 may be a server computer that is maintained by the mobile network carrier and may locate an internal consumer profile 104 associated with a mobile communication device 118 for authentication purposes. For example, based on a mobile network ID 106, the authentication network element 108 may locate a mobile network ID 106 of a mobile communication device 118 when the mobile communication device 118 transmits data through a mobile communication network maintained by the mobile network carrier, for example by transmitting data to the BTS 120 maintained by the mobile network carrier. The ad exchange 102 may perform mobile ad auctions and determine which ad bidder wins a mobile ad auction. The ad exchange 102 may be a server computer maintained by the mobile network carrier or by a third party instead of the mobile network carrier.

Ad impression bidding may be the means by which ad inventory is bought and sold on a per-impression basis, via programmatic instantaneous ad auction, similar to financial markets. With the ad auction mechanism, advertising buyers or bidders bid on an impression, and if the bid is won, the buyer's ad is instantly displayed on the publisher's site. Ad impression bidding lets advertisers manage and optimize ads from multiple ad networks by granting the user, the ad buyer or ad bidder, access to different networks and allowing them to create and launch advertising campaigns, prioritize networks and allocate backfill percentages. The ad exchange is the platform where ad inventory is exposed for ad bidders to bid on ad impressions.

In another embodiment, technologies discussed in this disclosure may be applied to another type of intermediate platform that exchanges information between mobile devices 118 and a platform that receives information about the mobile devices 118 and/or users of the mobile devices 118 in an indirect manner. In a different embodiment, the ad bidder may be another type of platform that receives information about the mobile devices 118 and/or users of the mobile devices 118 in an indirect manner. Information associated with the user or the device may be harvested. A mapping between an otherwise opaque identity and a subscriber identity or device identity that is constant across multiple applications may be determined. The mapping may be utilized to accumulate profile information for other purposes that the profile information may be used for. The opaque identity may be for a specific piece of hardware, such as a mobile communication device 118 as discussed throughout the present disclosure, or may be for a user login account in another embodiment.

The radio transceiver of the mobile communication device 118 may communicate with the base transceiver station 120 using any of a variety of wireless communication protocols including a code division multiple access (CDMA) wireless communication protocol, a global system for mobile communication (GSM) wireless communication protocol, a long-term evolution (LTE) wireless communication protocol, a world-wide interoperability for microwave access (WiMAX) wireless communication protocol, or another wireless communication protocol. The mobile device 118 may be any of a mobile phone, a personal digital assistant (PDA), a media player, a laptop computer, a desktop computer, a tablet computer, a notebook computer, a wearable computer, a headset computer, or another network/communications capable device. In an embodiment, the mobile communication device 118 may have other components (not shown) such as a near field communication (NFC) radio transceiver, a short range radio transceiver such as a wireless local area network (WLAN) radio transceiver, or other components.

In an embodiment, the application 124 may be stored in a memory of the ad bidder 122. When executed by a processor of the ad bidder 122, the application 124 may store ad auction related information, for example in the data store 126. For example, the application 124 may store an external consumer identifier and related consumer profile information when an ad bid request is received by the ad bidder 122. An external consumer identifier may be one of a Google advertising identifier, an Apple identifier for advertisers (IDFA), or another type of external consumer identifier to a mobile network carrier. The external consumer identifier may be assigned by a client application 116 on the mobile communication device 118, assigned by the ad exchange 102, assigned by the ad exchange 102 based on an identifier originally assigned by a client application 116, or generated in another manner. The client application 116 may be any application on the mobile communication device 118 or an ad application programming interface (API) on the mobile communication device 118. The client application 116, as an ad application programming interface, may generate one and the same external consumer identifier for multiple applications on the mobile communication device 118. For example, the client application 116 may generate one and the same external consumer identifier for a gaming application, a web browser, and a weather application on the mobile communication device 118. A user of the mobile communication device 118 may choose to reset the external consumer identifier or opt out from targeted advertising.

For example, when the ad bidder 122 receives an ad bid request with an external consumer identifier and related consumer profile information, the application 124 may store the external consumer identifier and the related consumer profile information, for example in an entry in the data store 126. The consumer profile information may comprise the age, gender, location, hobby, shopping preference, or another type of consumer profile information, of a user or a subscriber of the mobile communication device 118. For example, the consumer profile information associated with the external consumer identifier may be that the user or the subscriber of the mobile communication device 118 is a male that is interested in theater and national collegiate athletic association (NCAA) March madness. This information may be known to an application on the mobile communication device 118. For example, when the user or subscriber of the mobile communication device 118 downloaded and/or signed up for the application, he may be asked to provide the above information. Alternatively, he may have been asked and/or chosen to integrate the above information from another application or social network, for example Facebook, to the application.

The server application (app) 112 may be stored in a memory of the server 114. When executed by a processor of the server 114, the server app 112 may perform a variety of functionality to map an external consumer identifier to a mobile network ID 106 and update an associated internal consumer profile 104. A mobile network ID 106 may be one of a network access identifier (NAI), an equipment identifier, a MAC address, a subscriber identifier, or another type of mobile network identification. For example, when a pixel tag request from the mobile communication device 118 is received at the authentication network element 108, the authentication network element 108 may locate a corresponding mobile network ID 106 of the mobile communication device 118. The external consumer identifier may be encapsulated in the pixel tag request. When the authentication network element 108 locates the corresponding mobile network ID 106 of the mobile communication device 118, the authentication network element 108 is able to associate the external consumer identifier and the mobile network ID of the device 118. The authentication network element 108 may then notify the server app 112 of this association. The server app 112 may store the mapping of the mobile network ID 106 to the external consumer identifier in the data store 126, for example to the entry associated with the external consumer identifier and the related consumer profile information. The server app 112 may update an associated internal consumer profile 104 based on the mobile network ID 106 and the consumer profile information embedded in the ad bid request.

For example, when a pixel tag request from the mobile communication device 118 is received at the authentication network element 108, the authentication network element 108 may identify a mobile network ID 106 of the mobile communication device 118. The authentication network element 108 may transmit a notification to the server app 112 that associates the mobile network ID 106 and the associated external consumer identifier of the mobile communication device 118. Alternatively, the server app 112 may periodically transmit a request to the authentication network element 108 for mobile network IDs 106 and associated external consumer identifiers of mobile communication devices 118 that communicate through the mobile communication network maintained by the mobile network carrier. The server app 112 may store the mapping of the external consumer identifier to the mobile network ID 106, for example to a corresponding entry in the data store 126.

The server app 112 may map the external consumer identifier to a corresponding internal consumer profile 104 based on the mapping between the external consumer identifier and the mobile network ID 106. For example, each internal consumer profile 104 may comprise a mobile network ID 106. Based on a mobile network ID 106, the internal consumer profile 104 may be located, for example using as a key to the data record. When a mobile communication device 118 is identified with a mobile network ID 106 and/or is mapped to an external consumer identifier by the authentication network element 108, the internal consumer profile 104 associated with the mobile network ID 106 may be identified based on the mobile network ID 106 and may be mapped to the external consumer identifier. The internal consumer profile 104 may be updated accordingly based on the consumer profile information embedded in the ad bid request that is stored in the data store 126 with the external consumer identifier. For example, the internal consumer profile 104 may be updated with the consumer profile information described earlier: the user and/or the subscriber of the mobile communication device 118 may be a male that is interested in theater and national collegiate athletic association March madness. The consumer profile information may have been built from a variety of sources. For example, the consumer profile information may be user entered information on a website, harvested behavior information by an application or browser on the mobile communication device 118, or from another type of source.

The server app 112 may select an ad to be transmitted to the mobile communication device 118 based on the updated internal consumer profile 104 when the ad bidder 122 wins a second ad auction. The consumer profile information used for updating the internal consumer profile 104 may be originally stored and/or transmitted by the client application 116 on the mobile communication device 118. Thus, more highly targeted advertisement selection for the mobile communication device 118 may be promoted for higher click-through rate by combining consumer profile information stored by the client application 116 on the mobile communication device 118 and internal consumer profile 104 information maintained by the mobile network carrier.

For example, the consumer profile information associated with the external consumer identifier, stored in the data store 126 when the ad bid request was received at the ad bidder 122, had been transmitted from the client application 116 on the mobile communication device 118. When the ad bidder 122 wins the second ad auction to present an ad impression to a mobile communication device 118 associated with the same external consumer identifier, the authentication network element 108 may transmit the external consumer identifier and an associated mobile network ID to the server app 112.

The mapping stored in the data store 126 between the external consumer identifier and the stored mobile network ID 106 may be examined by the server app 112. It may be determined by the server app 112 whether or not the stored mapping between the external consumer identifier and the stored mobile network ID 106 stays valid, which means whether or not the stored mapping from the external consumer identifier to the stored mobile network ID 106 matches the mapping from the external consumer identifier and the mobile network ID just transmitted from the authentication network element 108. Based on whether or not the stored mapping between the external consumer identifier and the stored mobile network ID 106 stays valid, a variety of action may be performed. When the stored mapping between the external consumer identifier and the stored mobile network ID 106 stays valid, which means the stored mobile network ID 106 and the mobile network ID transmitted from the authentication network element 108 are the same, the internal consumer profile 104 may be updated by the server app 112 based on consumer profile information embedded in a second ad bid request.

When the stored mapping between the external consumer identifier and the stored mobile network ID 106 is determined to be no longer valid, which means the stored mobile network ID 106 and the mobile network ID just transmitted from the authentication network element 108 are different, the stored mapping of the external consumer identifier to the stored mobile network ID 106 may be removed by the server app 112. The mapping between the external consumer identifier to the mobile network ID just transmitted from the authentication network element 108 may be stored by the server app 112, for example by locating an entry of a corresponding internal consumer profile 104 based on the mobile network ID 106 and store the external consumer identifier into the entry. The internal consumer profile 104 associated with the mobile network ID may be updated by the server app 112 based on the consumer profile information obtained from the second ad bid request.

Note that a mobile communication device 118 may be associated with multiple external consumer identifiers. For example, multiple client applications 116 executing on the mobile communication device 118 may assign different external consumer identifiers to the mobile communication device 118. When an external consumer identifier is received at the mobile communication network, for example at the application 124, the external consumer identifier may be stored in the data store 126 by the application 124 with a corresponding application identifier, for example an application name, an application number, or another type of application identifier. Thus, external consumer identifiers from the same mobile communication device 118 but from different client applications 116 executing on the mobile communication device 118 may not be mistaken as from different mobile communication devices 118. Multiple mappings between external consumer identifiers and a mobile network ID may be valid for a mobile communication device 118 when the external consumer identifiers correspond to different application identifiers. Said in other words, more than one external consumer identifier may correspond to one and the same mobile network ID when each external consumer identifier corresponds to a specific application identifier.

In this case, when the ad bidder 122 wins the second ad auction to present an ad impression to a mobile communication device 118 associated with the same external consumer identifier, the stored mapping of the external consumer identifier, the stored mobile network ID 106, and a corresponding application identifier may be examined against the mapping of the external consumer identifier, the mobile network ID just transmitted from the authentication network element 108, and a corresponding application identifier. Further action to be taken, for example by the server app 112, may be similar to the case discussed above, where no application identifier was mentioned, based on the mapping results.

Figure 2:
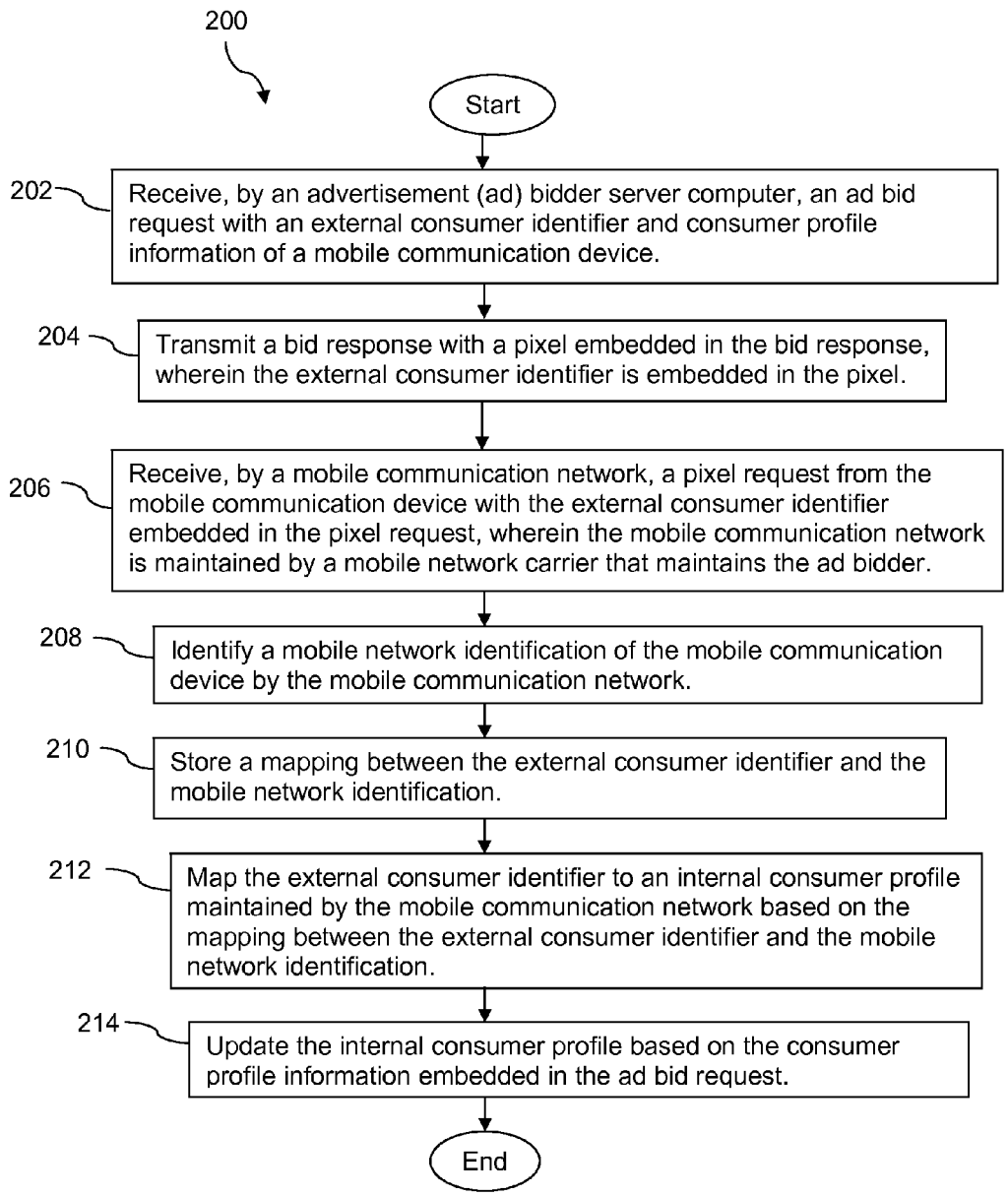
FIG. 2 is a flow chart illustrating a method according to an embodiment of the disclosure.

Turning now to FIG. 2, a method 200 is described. At block 202, an ad bid request with an external consumer identifier and consumer profile information of a mobile communication device is received by an advertisement (ad) bidder server computer. For example, an ad bid request with an external consumer identifier and consumer profile information of a mobile communication device 118 may be received by the ad bidder 122. At block 204, a bid response is transmitted with a pixel tag embedded in the bid response, wherein the external consumer identifier is embedded in the pixel tag. For example, a bid response may be transmitted by the application 124 on the ad bidder 122 or another application on the ad bidder 122 with a pixel tag embedded in the bid response. The pixel tag may be encoded and/or embedded in the bid response. In an embodiment, the external consumer identifier may be embedded in the pixel tag. A pixel tag, also called a web beacon, a web bug, or a clear graphic interchange format (GIF), is an often-transparent graphic image or an overlooked graphic image, usually no larger than 1 pixel×1 pixel. The pixel tag may not provide any noticeable visual effect to a web page, but may be used in a hypertext transfer protocol (HTTP) message to create an HTTP transaction. The pixel tag may provide data needed for analytics for improved ad targeting or other web personalization.

For example, a pixel tag may be used to monitor the behavior of a user visiting a web site. When the hypertext markup language (HTML) code for the pixel tag points to a site to retrieve the image, it may transmit information such as the IP address of the mobile communication device that retrieved the image, the time the pixel tag was viewed and for how long, the type of browser that retrieved the image, or another type of information. The pixel tag may be in a format, for example encoded in a specific format, that may be used by a mobile communication network to differentiate a pixel tag request from other http request messages. For example, the pixel tag may serve as a trigger for the mobile communication network to analyze an http response with the pixel tag. In another embodiment, another mechanism for generating an http request or another message may be employed, wherein the http request or message comprises a unique identifier for the mobile communication device 118 or, alternatively, a unique identifier for the previous request through the intermediary platform (for example the ad bidder 122).

At block 206, a pixel tag request from the mobile communication device with the external consumer identifier embedded in the pixel tag request is received by a mobile communication network, wherein the mobile communication network is maintained by a mobile network carrier that maintains the ad bidder. For example, a pixel tag request from the mobile communication device 118 may be received by the mobile communication network. The pixel tag request may be transmitted by the mobile communication device 118 in response to an ad response transmitted by the ad exchange 102 after the ad bidder 122 wins an ad action to present an ad impression on the mobile communication device 118.

At block 208, a mobile network identification of the mobile communication device is identified by the mobile communication network. For example, when the mobile communication device 118 transmits the pixel tag request, the mobile communication network, for example the authentication network element 108, may be triggered by the pixel tag to capture and/or analyze the pixel tag request. The mobile network ID 106 of the mobile communication device 118 may be identified by the authentication network element 108. The authentication network element 108 may also obtain the external consumer identifier embedded in the pixel tag and/or map the external consumer identifier to the mobile network ID 106. The authentication network element 108 may further transmit a notification to the server app 112 indicating the mapping of the external consumer identifier to the mobile network ID 106. Alternatively, the server app 112 may request for mapping of external consumer identifiers to mobile network IDs 106 periodically, for example every 1 second, every 0.1 second, every 10 millisecond, or at some other periodic interval.

At block 210, a mapping between the external consumer identifier and the mobile network identification is stored. For example, the mapping between the external consumer identifier and the mobile network ID 106 may be stored by the server app 112, for example in the data store 126. At block 212, the external consumer identifier is mapped to an internal consumer profile 104 maintained by the mobile communication network based on the mapping between the external consumer identifier and the mobile network identification 106. At block 214, the internal consumer profile 104 is updated based on the consumer profile information embedded in the ad bid request.

Figure 3A:
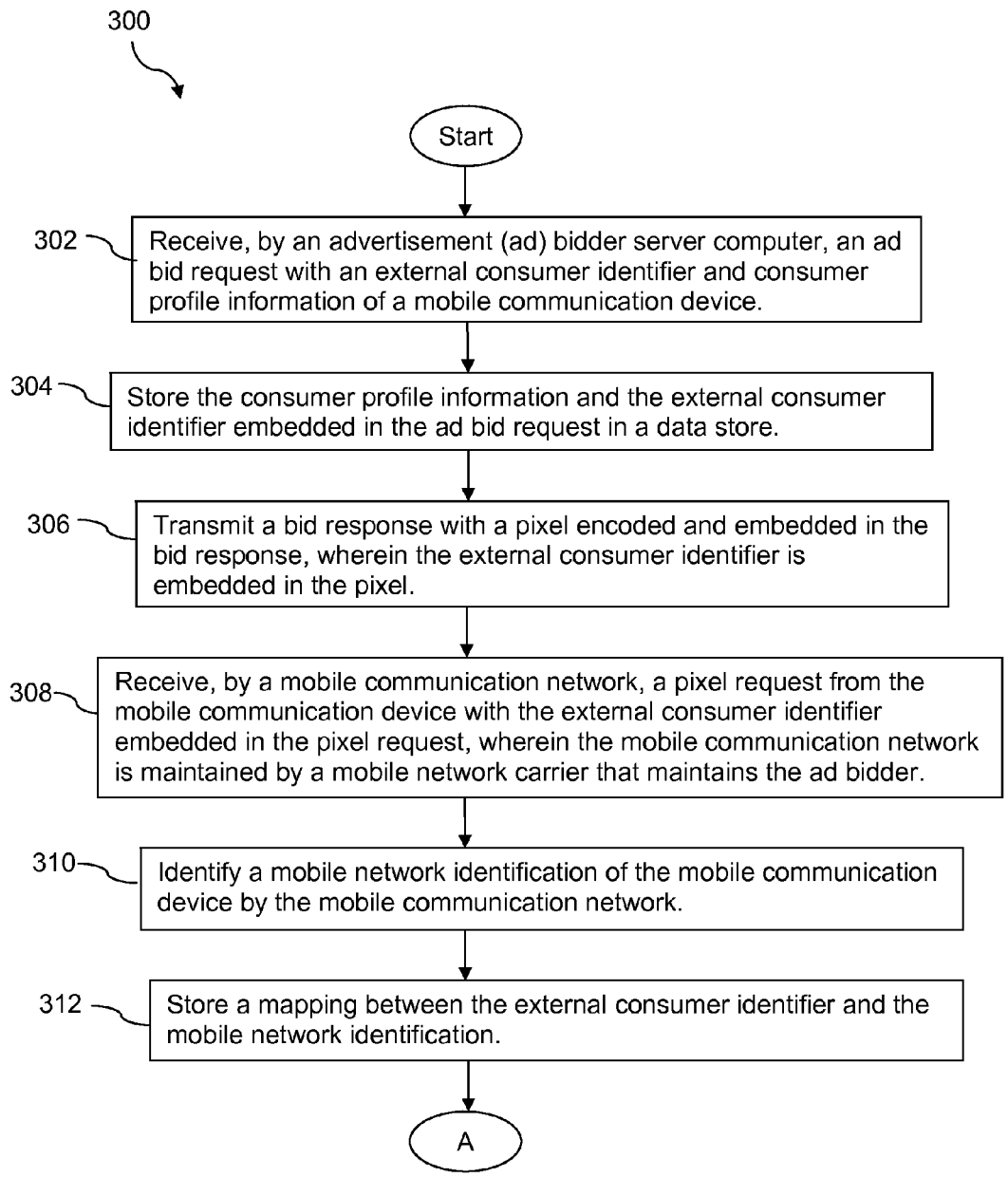
FIG. 3A and FIG. 3B is a flow chart illustrating another method according to an embodiment of the disclosure.
Figure 3B:
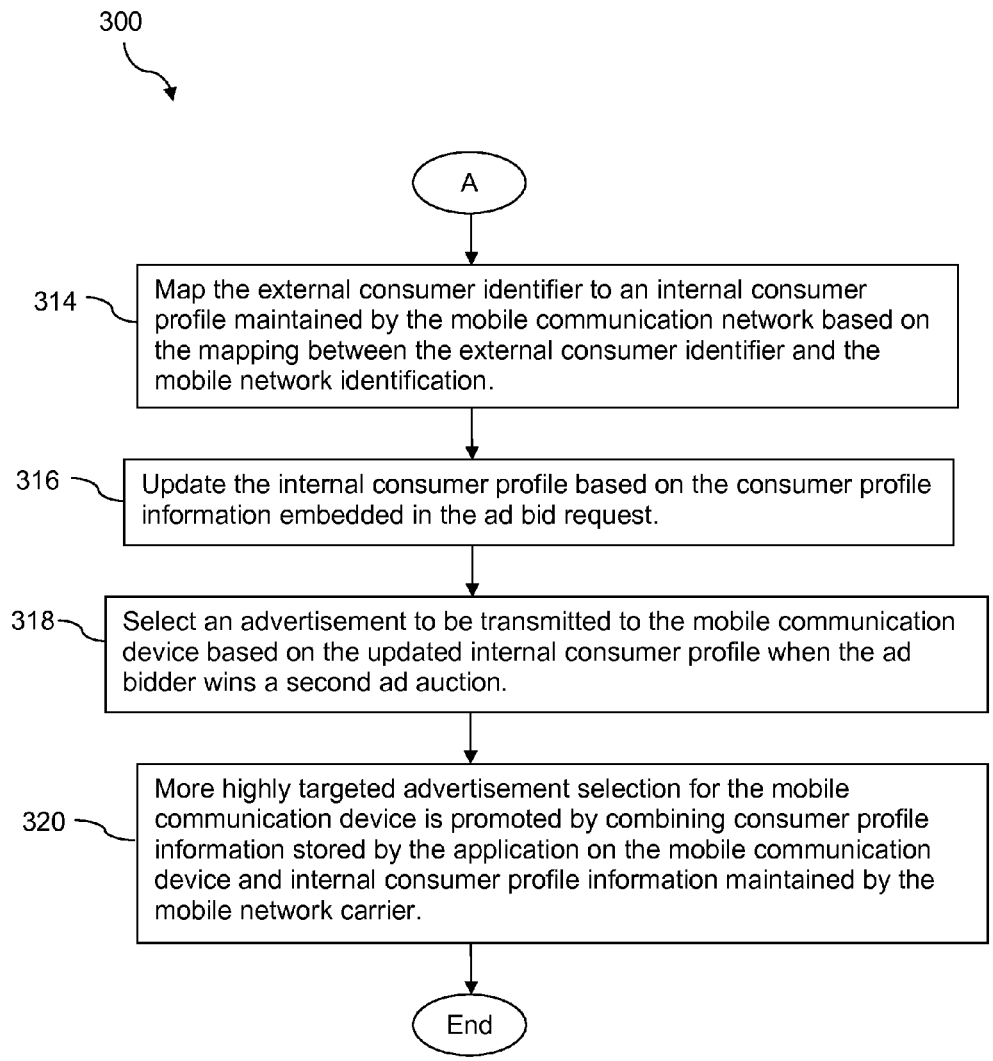

Turning now to FIG. 3A and FIG. 3B, a method 300 is described. At block 302, an ad bid request with an external consumer identifier and consumer profile information of a mobile communication device 118 is received by an advertisement (ad) bidder server computer 122. At block 304, the consumer profile information and the external consumer identifier embedded in the ad bid request are stored in a data store. For example, the consumer profile information and the external consumer identifier embedded in the ad bid request may be stored by the application 124 on the ad bidder 122 in the data store 126, for example in an entry. The entry may be located based on the external consumer identifier.

At block 306, a bid response with a pixel tag encoded and embedded in the bid response is transmitted, wherein the external consumer identifier is embedded in the pixel tag. At block 308, a pixel tag request from the mobile communication device 118 with the external consumer identifier embedded in the pixel tag request is received by a mobile communication network, wherein the mobile communication network is maintained by a mobile network carrier that maintains the ad bidder 122. At block 310, a mobile network identification of the mobile communication device 118 is identified by the mobile communication network. At block 312, a mapping between the external consumer identifier and the mobile network identification 106 is stored. At block 314, the external consumer identifier is mapped to an internal consumer profile 104 maintained by the mobile communication network based on the mapping between the external consumer identifier and the mobile network identification 106.

At block 316, the internal consumer profile 104 is updated based on the consumer profile information embedded in the ad bid request. At block 318, an advertisement is selected to be transmitted to the mobile communication device based on the updated internal consumer profile when the ad bidder wins a second ad auction. For example, a bidding price for the second ad auction may be adapted by the ad bidder 122 based on the updated internal consumer profile 104 associated with the mobile network ID 106 that is mapped to the external consumer identifier. When the ad bidder 122 wins a second ad auction, a bidding price may be adapted to offer to the ad exchange 102 and/or an advertisement may be selected to be transmitted to the mobile communication device 118 based on the updated internal consumer profile 104. The updated internal consumer profile 104 may comprise more targeting information on the user and/or the subscriber of the mobile communication device 118 than the internal consumer profile 104 before it was updated with consumer profile information transmitted from the client application 116 and embedded in the ad bid request.

For example, the ad bidder 122 or the application 124 on the ad bidder 122 may locate a corresponding internal consumer profile 104 based on a mobile network ID 106 that was mapped to the external consumer identifier. Based on the located internal consumer profile 104, the ad bidder 122 may adapt a bidding price to offer to the ad exchange 102. The internal consumer profile 104, before updated with consumer profile information obtained from the first ad bid request, may comprise information for the subscriber of the mobile communication device 118, such as the subscriber is a male. Consumer profile information obtained from the first ad bid request may comprise information for the subscriber, such as a male that is interested in theater and national collegiate athletic association March madness.

By integrating the consumer profile information into the internal consumer profile 104 after the first ad auction win, a fuller internal consumer profile 104 may be built for adapting a bidding price for the second ad auction. For example, the ad bidder 122 may offer a higher than average bidding price to present a national collegiate athletic association March madness related ad impression to the mobile communication device 118 since the click-through rate with the subscriber of the mobile communication device 118 is higher than an average click-through rate. In this case, the ad bidder 122 may pay a higher than average bidding price to the ad exchange but may have a higher than average chance of making the money back because the subscriber is more likely than average to click the ad impression and/or make a purchase.

At block 320, more highly targeted advertisement selection for the mobile communication device 118 is promoted by combining consumer profile information stored by the application 116 on the mobile communication device 118 and internal consumer profile information 104 maintained by the mobile network carrier. For example, the internal consumer profile 104 may comprise characteristics, such as demographics, psychographics, behavior variables, firmographic variables, or other characteristics of the user and/or subscriber of the mobile communication device 118. The characteristics of the user and/or subscriber of the mobile communication device 118 stored in the internal consumer profile 104 may be obtained by the mobile network carrier from the mobile communication network. Consumer profile information transmitted from the mobile communication device 118 may be obtained by the client application 116 and may differ from the characteristics originally stored in the internal consumer profile 104 in terms of types. For example, the consumer profile information stored by the client application 116 may be application-specific consumer information, for example how often the consumer uses the client application 116. Thus, by combining the consumer profile information stored by the client application 116 and the internal consumer profile information 104, more targeted advertising for the mobile communication device 118 may be promoted.

Figure 4:
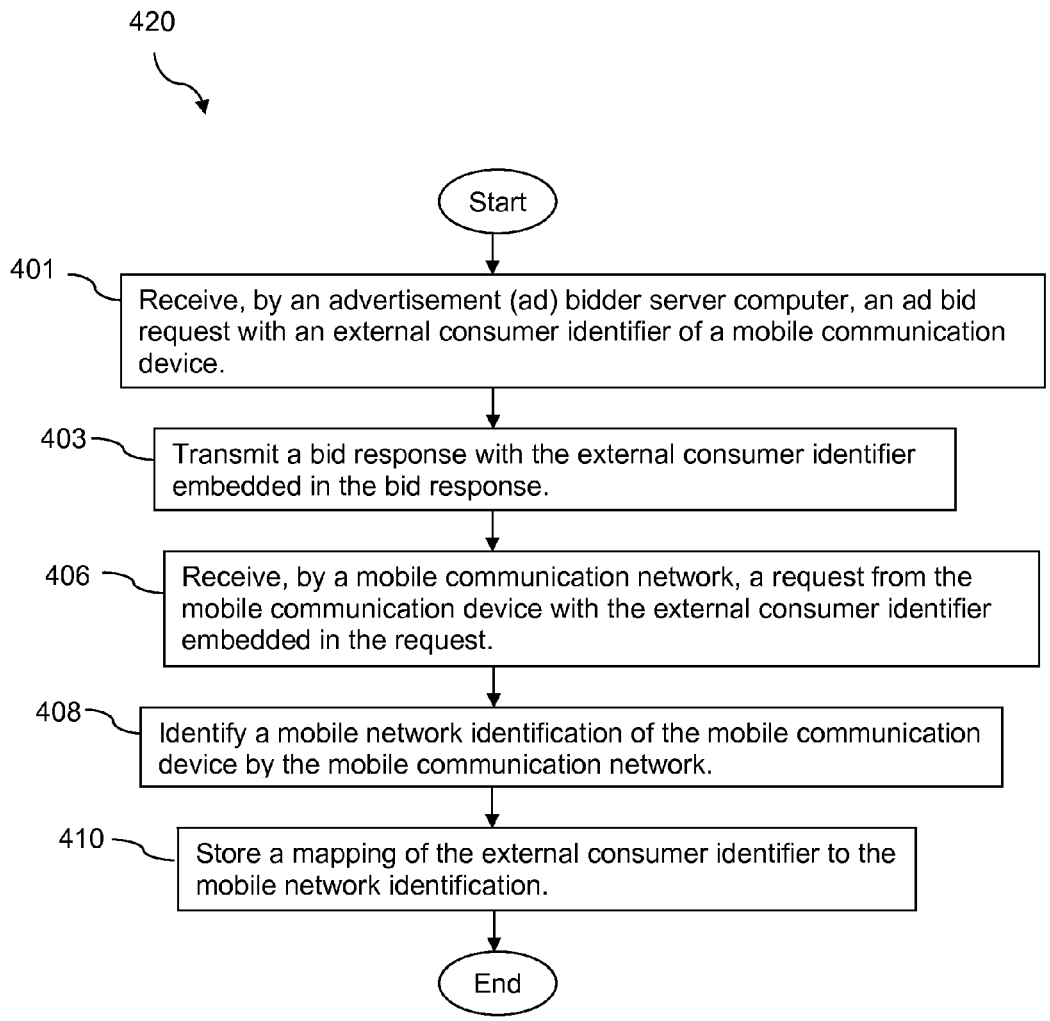
FIG. 4 is a flow chart illustrating a third method according to an embodiment of the disclosure.

Turning now to FIG. 4, a method 420 is described. At block 401, an ad bid request with an external consumer identifier of a mobile communication device is receive by an advertisement (ad) bidder server computer 122. At block 403, a bid response with the external consumer identifier embedded in the bid response is transmitted. At block 406, a request from the mobile communication device 118 with the external consumer identifier embedded in the request is received by a mobile communication network. At block 408, a mobile network identification 106 of the mobile communication device 118 is identified by the mobile communication network. At block 410, a mapping of the external consumer identifier to the mobile network identification 106 is stored.

Figure 5:
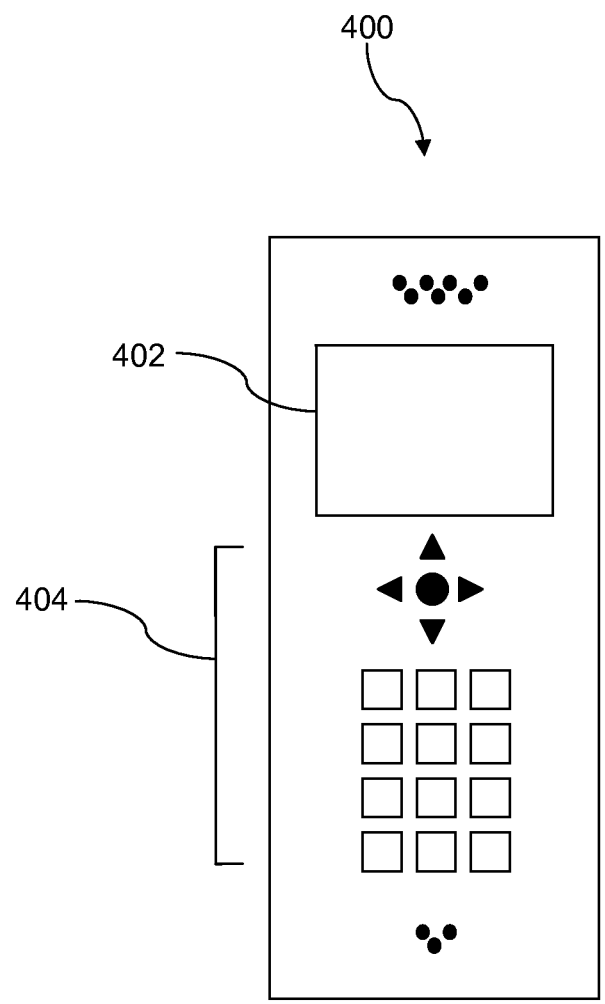
FIG. 5 is an illustration of a mobile communication device according to an embodiment of the disclosure.

FIG. 5 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 6:
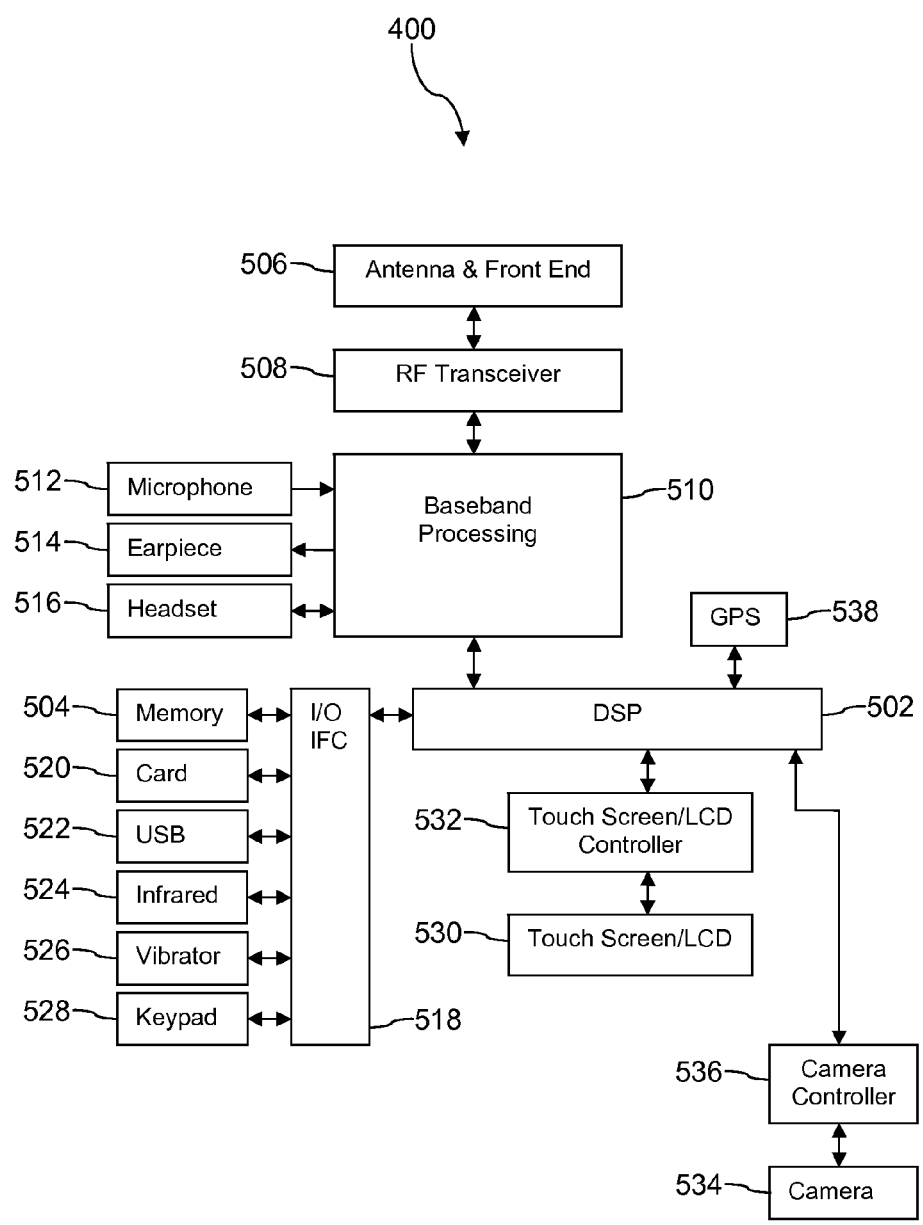
FIG. 6 is a block diagram of a mobile communication device according to an embodiment of the disclosure.

FIG. 6 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the input/output interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 7A:
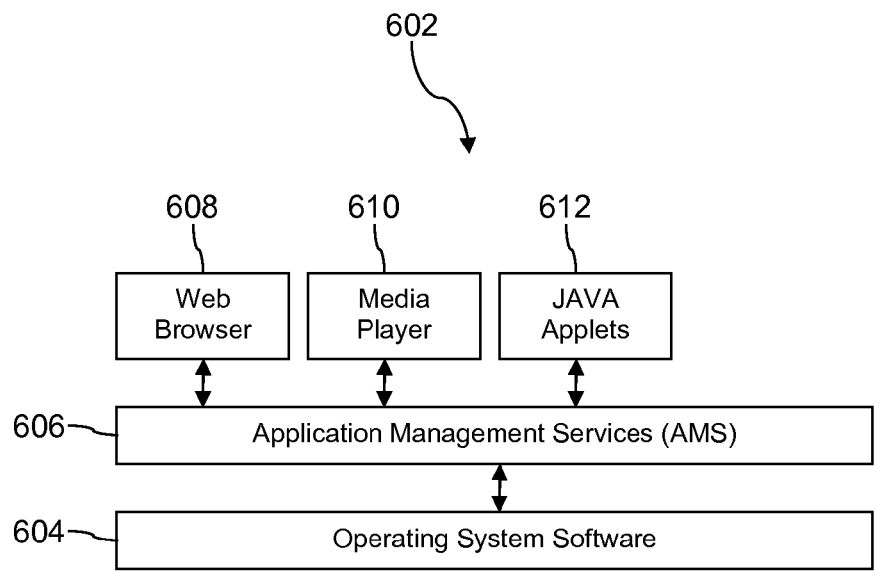
FIG. 7A is a block diagram of a software architecture of a mobile communication device according to an embodiment of the disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 7A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 7B:
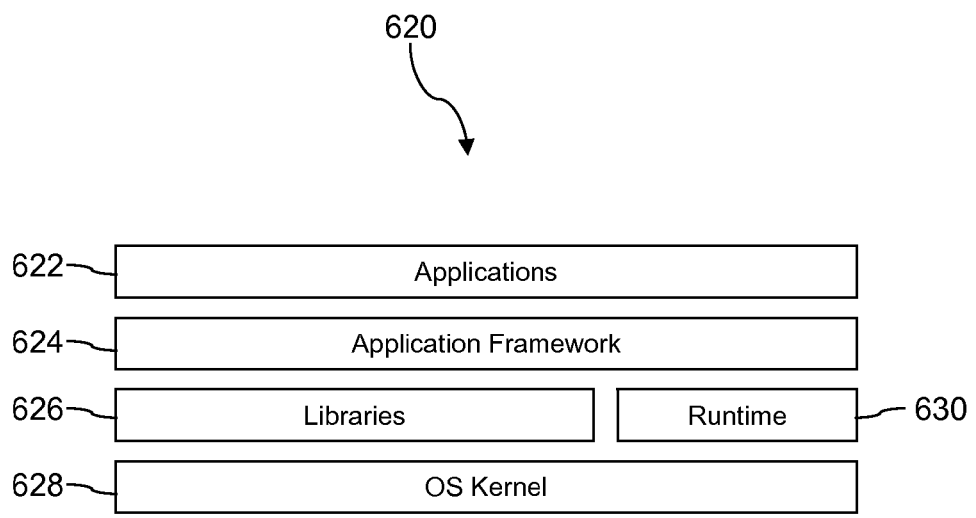
FIG. 7B is a block diagram of another software architecture of a mobile communication device according to an embodiment of the disclosure.

FIG. 7B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
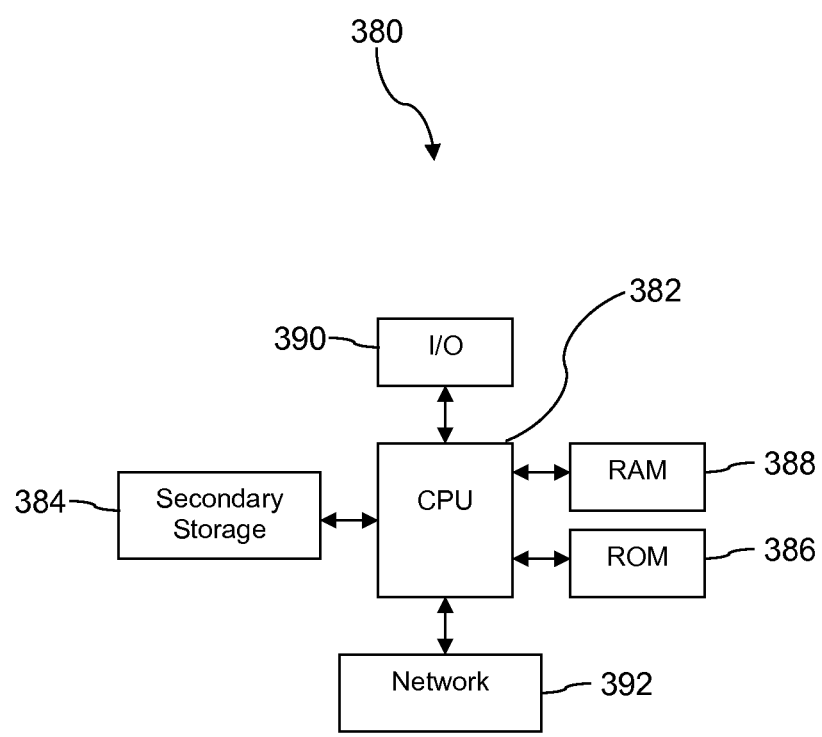
FIG. 8 is a block diagram of a computer system according to an embodiment of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

The invention claimed is:

1. A method of consolidating consumer profiles based on mapping an external identifier of a mobile communication device to a mobile network identification by an authentication network element computer, comprising:
   receiving, by an advertisement (ad) bidder server computer from a mobile communication device, an ad bid request with an external consumer identifier and consumer profile information of the mobile communication device;
   transmitting, by the ad bidder server computer to the mobile communication device, a bid response with a pixel tag embedded in the bid response, wherein the external consumer identifier is embedded in the pixel tag;
   detecting, by the authentication network element computer via a mobile communication network, that a pixel tag request is being sent via the mobile communication network from the mobile communication device, where the external consumer identifier is embedded in the pixel tag request, wherein the mobile communication network is maintained by a mobile network carrier that maintains the ad bidder;
   capturing, by the authentication network element computer, the pixel tag request and extracting the external consumer identifier from the pixel tag request;
   identifying, by the authentication network element computer, a mobile network identification associated with the mobile communication device that sent the pixel tag request via the mobile communication network;
   creating and storing, by the authentication network element computer, a first mapping between the external consumer identifier and the mobile network identification;
   transmitting, by the authentication network element computer, a notification comprising the first mapping to a network server;
   in response to transmission of the notification, creating, by the network server, a second mapping that associates the external consumer identifier to an internal consumer profile maintained by the mobile communication network based on the first mapping between the external consumer identifier and the mobile network identification; and
   updating the internal consumer profile based on the second mapping to the consumer profile information embedded in the ad bid request.

2. The method of claim 1, wherein the ad bid request is transmitted from an ad exchange after an application on the mobile communication device transmits an ad request to the ad exchange.

3. The method of claim 2, wherein the external consumer identifier is encoded and then embedded in the bid response to be transmitted to the ad exchange.

4. The method of claim 1, wherein the external consumer identifier is one of a Google advertising identifier and an Apple identifier for advertisers (IDFA).

5. The method of claim 1, wherein the mobile network identification is one of a network access identifier (NAI), an equipment identifier, a MAC address, or a subscriber identifier.

6. The method of claim 1, wherein a targeted advertisement is transmitted via the mobile communication network to the mobile communication device based on the updated internal consumer profile when the ad bidder wins a second ad auction to present a second ad impression on the mobile communication device.

7. The method of claim 6, wherein when the ad bidder wins the second ad auction, the mapping between the external consumer identifier and the mobile network identification is examined by the ad bidder server computer to determine whether or not the mapping stays valid.

8. The method of claim 7, wherein the internal consumer profile is updated based on new consumer profile information, embedded in the second ad bid request with the external consumer identifier, that was added to a data store maintained by the mobile network carrier between the first ad auction win and the second ad auction win.

9. A method of consolidating consumer profiles based on mapping an external identifier of a mobile communication device to a mobile network identification by an authentication network element computer, comprising:

receiving, by an advertisement (ad) bidder server computer from a mobile communication device, an ad bid request with an external consumer identifier and consumer profile information of the mobile communication device;

storing, by the ad bidder server computer, the consumer profile information and the external consumer identifier embedded in the ad bid request in a data store;

transmitting, by the ad bidder server computer to the mobile communication device, a bid response with a pixel tag encoded and embedded in the bid response, wherein the external consumer identifier is embedded in the pixel tag;

detecting, by the authentication network element computer via a mobile communication network, that a pixel tag request is being sent via the mobile communication network from the mobile communication device, where the external consumer identifier is embedded in the pixel tag request, wherein the mobile communication network is maintained by a mobile network carrier that maintains the ad bidder;

capturing, by the authentication network element computer, the pixel tag request and extracting the external consumer identifier from the pixel tag request;

identifying, by the authentication network element computer, a mobile network identification associated with the mobile communication device that sent the pixel tag request via the mobile communication network;

creating and storing, by the authentication network element computer, a first mapping between the external consumer identifier and the mobile network identification;

transmitting, by the authentication network element computer, a notification comprising the first mapping to a network server;

in response to transmission of the notification, creating, by the network server, a second mapping that associates the external consumer identifier to an internal consumer profile maintained by the mobile communication network based on the first mapping between the external consumer identifier and the mobile network identification;

updating the internal consumer profile based on the second mapping to the consumer profile information embedded in the ad bid request; and selecting an advertisement to be transmitted to the mobile communication device based on the updated internal consumer profile in response to the ad bidder server computer winning a second ad auction;

whereby more highly targeted advertisement selection for the mobile communication device is promoted by combining consumer profile information stored on the mobile communication device and internal consumer profile information maintained by the mobile network carrier.

10. The method of claim 9, wherein the mobile communication device is one of a mobile phone, a personal digital assistant (PDA), a media player, a laptop computer, a desktop computer, a tablet computer, a notebook computer, a wearable computer, or a headset computer.

11. The method of claim 9, wherein the mobile communication device establishes a wireless communication with a radio access network according to a code division multiple access (CDMA) wireless communication protocol, a global system for mobile communication (GSM) wireless communication protocol, a long-term evolution (LTE) wireless communication protocol, or a world-wide interoperability for microwave access (WiMAX) wireless communication protocol.

12. The method of claim 9, wherein the consumer profile information comprises information associated with at least one of the age, gender, location, hobby, shopping preference of a user or a subscriber of the mobile communication device.

13. The method of claim 9, wherein the external consumer identifier is assigned by an application on the mobile communication device.

14. The method of claim 9, wherein the external consumer identifier is assigned by an ad exchange that performs an ad auction and determines which ad bidder wins the ad auction.

15. The method of claim 9, wherein a bidding price for the second ad auction is adapted based on the updated internal consumer profile with the mobile network identification that is mapped to the external consumer identifier.

16. A method of consolidating consumer profiles based on mapping an external identifier of a mobile communication device to a mobile network identification by an authentication network element computer, comprising:

receiving, by an advertisement (ad) bidder server computer from a mobile communication device, an ad bid request with an external consumer identifier of the mobile communication device;

transmitting, by the ad bidder server computer to the mobile communication device, a bid response with the external consumer identifier embedded in the bid response;

detecting, by the authentication network element computer via a mobile communication network, that a pixel tag request is being sent via the mobile communication network from the mobile communication device, where the external consumer identifier is embedded in the pixel tag request;

capturing, by the authentication network element computer, the pixel tag request and extracting the external consumer identifier from the pixel tag request;

identifying, by the authentication network element computer, a mobile network identification associated with the mobile communication device that sent the pixel tag request via the mobile communication network;

creating and storing, by the authentication network element computer, a mapping between the external consumer identifier and the mobile network identification; and transmitting, by the authentication network element computer, a notification comprising the mapping to a network server.

17. The method of claim 16, wherein the mobile network identification is kept confidential from an ad exchange that performs an ad auction and determines which ad bidder wins the ad auction.

18. The method of claim 16, wherein the mobile network identification is one of a network access identifier (NAI), an equipment identifier, a MAC address, or a subscriber identifier.

19. The method of claim 16, wherein the external consumer identifier is encoded and embedded in the pixel tag by the ad bidder server computer, and wherein the pixel tag is embedded in the bid response.

20. The method of claim 16, wherein an internal consumer profile, maintained by a mobile network carrier that maintains the ad bidder, is updated based on consumer profile information embedded in the ad bid request.

* * * * *